US012607921B2

(12) United States Patent
Nakamura

(10) Patent No.: US 12,607,921 B2
(45) Date of Patent: Apr. 21, 2026

(54) PROJECTION DEVICE HAVING DICHROIC PRISM AND THREE SELF-LUMINOUS DISPLAY DEVICES

(71) Applicant: SEIKO EPSON CORPORATION, Tokyo (JP)

(72) Inventor: Taku Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 396 days.

(21) Appl. No.: 18/184,671

(22) Filed: Mar. 16, 2023

(65) Prior Publication Data

US 2023/0296974 A1     Sep. 21, 2023

(30) Foreign Application Priority Data

Mar. 18, 2022     (JP) ................................. 2022-043559

(51) Int. Cl.
*G03B 21/20*          (2006.01)
*G09G 3/00*           (2006.01)

(52) U.S. Cl.
CPC ..... *G03B 21/2066* (2013.01); *G03B 21/2033* (2013.01); *G09G 3/001* (2013.01); *G09G 2330/02* (2013.01)

(58) Field of Classification Search
CPC ............ G03B 21/2066; G03B 21/2033; G03B 21/2013; G09G 3/001; G09G 2330/02
USPC ....................................................... 353/122
See application file for complete search history.

(56) References Cited

U.S. PATENT DOCUMENTS

| | | | |
|---|---|---|---|
| 5,673,127 A | 9/1997 | Takahara et al. | |
| 5,875,008 A | 2/1999 | Takahara et al. | |
| 6,049,364 A | 4/2000 | Takahara et al. | |
| 6,218,679 B1 | 4/2001 | Takahara et al. | |
| 2003/0147144 A1* | 8/2003 | Roddy ................... | G03B 33/08 |
| | | | 359/634 |
| 2005/0146652 A1 | 7/2005 | Yokoyama et al. | |
| 2019/0302466 A1* | 10/2019 | Koshihara .......... | G02B 27/0972 |
| 2019/0302468 A1 | 10/2019 | Koshihara | |
| 2019/0305255 A1* | 10/2019 | Koshihara ............ | G02B 27/149 |

(Continued)

FOREIGN PATENT DOCUMENTS

| | | |
|---|---|---|
| CN | 108319096 | 7/2018 |
| JP | H11-095185 | 4/1999 |

(Continued)

*Primary Examiner* — Magda Cruz
(74) *Attorney, Agent, or Firm* — JCIPRNET

(57)          ABSTRACT

A projection device includes a dichroic prism, a first self-luminous display device, a second self-luminous display device, a third self-luminous display device, and a projection optical system. The dichroic prism has a first surface, a second surface, a third surface, and a fourth surface, and is configured to emit combined image light from the fourth surface. The first self-luminous display device is configured to use light of a first wavelength to emit first image light to the first surface. The second self-luminous display device is configured to use light of a second wavelength to emit second image light to the second surface. The third self-luminous display device is configured to use light of a third wavelength to emit third image light to the third surface. The projection optical system is configured to project, onto a projection target, the combined image light emitted from the dichroic prism.

10 Claims, 22 Drawing Sheets

(56) References Cited

U.S. PATENT DOCUMENTS

| | | | |
|---|---|---|---|
| 2020/0026083 A1* | 1/2020 | Yamamoto | G02B 27/0172 |
| 2020/0150436 A1* | 5/2020 | Fukase | G03H 1/0248 |

FOREIGN PATENT DOCUMENTS

| | | |
|---|---|---|
| JP | 2002162614 | 6/2002 |
| JP | 2003057746 | 2/2003 |
| JP | 2007133125 | 5/2007 |
| JP | 2019-174515 | 10/2019 |
| JP | 2019192889 | 10/2019 |
| JP | 2022024294 | 2/2022 |

* cited by examiner

PROJECTION DEVICE HAVING DICHROIC PRISM AND THREE SELF-LUMINOUS DISPLAY DEVICES

The present application is based on, and claims priority from JP Application Serial Number 2022-043559, filed Mar. 18, 2022, the disclosure of which is hereby incorporated by reference herein in its entirety.

BACKGROUND

1. Technical Field

The present disclosure relates to a projection device.

2. Related Art

JP-A-2019-174515 discloses a display device in which light emitted from each of three organic electroluminescence panels is combined by a dichroic prism and projected onto a screen or the like by a projection optical system. Each of the organic electroluminescence panels is a light emitting panel on which an organic electroluminescence element is provided, and is a self-luminous display device. The dichroic prism has a rectangular parallelepiped shape having a first incidence surface, a second incidence surface, a third incidence surface, and an emission surface, and has a ceiling surface and a bottom surface together with the side surfaces. The three self-luminous display devices are a first self-luminous display device that faces the first incident surface which is a rear surface of the dichroic prism, a second self-luminous display device that faces the second incident surface which is one side surface of the dichroic prism, and a third self-luminous display device that faces the third incident surface which is the other side surface of the dichroic prism. The light emitted from each of the self-luminous display devices passes through the dichroic prism to be superimposed on each other, and is emitted from the emission surface which is a front surface of the dichroic prism.

US-A-2007-0242161 describes that a display panel with pixel light sources disposed in an alignment has a rather wide divergence angle, although the divergence angle is reduced by a microlens.

As for the light emitted from each of the self-luminous display devices, each projection light is diffused while passing through the dichroic prism, and some light is reflected by the ceiling surface, the bottom surface, or the side surface before reaching the emission surface of the dichroic prism. Such light is emitted from the emission surface of the dichroic prism and then becomes stray light.

SUMMARY

In order to solve the above problem, a projection device of the present disclosure includes a dichroic prism, a first self-luminous display device, a second self-luminous display device, a third self-luminous display device, a projection optical system, a control unit, and a power supply unit. The dichroic prism has a first surface, a second surface, a third surface, and a fourth surface, and is configured to emit combined image light from the fourth surface. The first self-luminous display device includes a plurality of first light-emitting elements configured to emit light of a first wavelength, and the first self-luminous display device is configured to use the light of the first wavelength to emit first image light to the first surface. The second self-luminous display device includes a plurality of second light-emitting elements configured to emit light of a second wavelength, and the second self-luminous display device is configured to use the light of the second wavelength to emit second image light to the second surface. The third self-luminous display device includes a plurality of third light-emitting elements configured to emit light of a third wavelength, and the third self-luminous display device is configured to use the light of the third wavelength to emit third image light to the third surface. The projection optical system is configured to project, onto a projection target, the combined image light emitted from the dichroic prism. The control unit is configured to control the first self-luminous display device, the second self-luminous display device, and the third self-luminous display device. The power supply unit is configured to supply power to the first self-luminous display device, the second self-luminous display device, the third self-luminous display device, and the control unit.

DESCRIPTION OF EXEMPLARY EMBODIMENTS

Hereinafter, projection devices according to embodiments of the present disclosure will be described with reference to the accompanying drawings.

Embodiment 1

Figure 1:
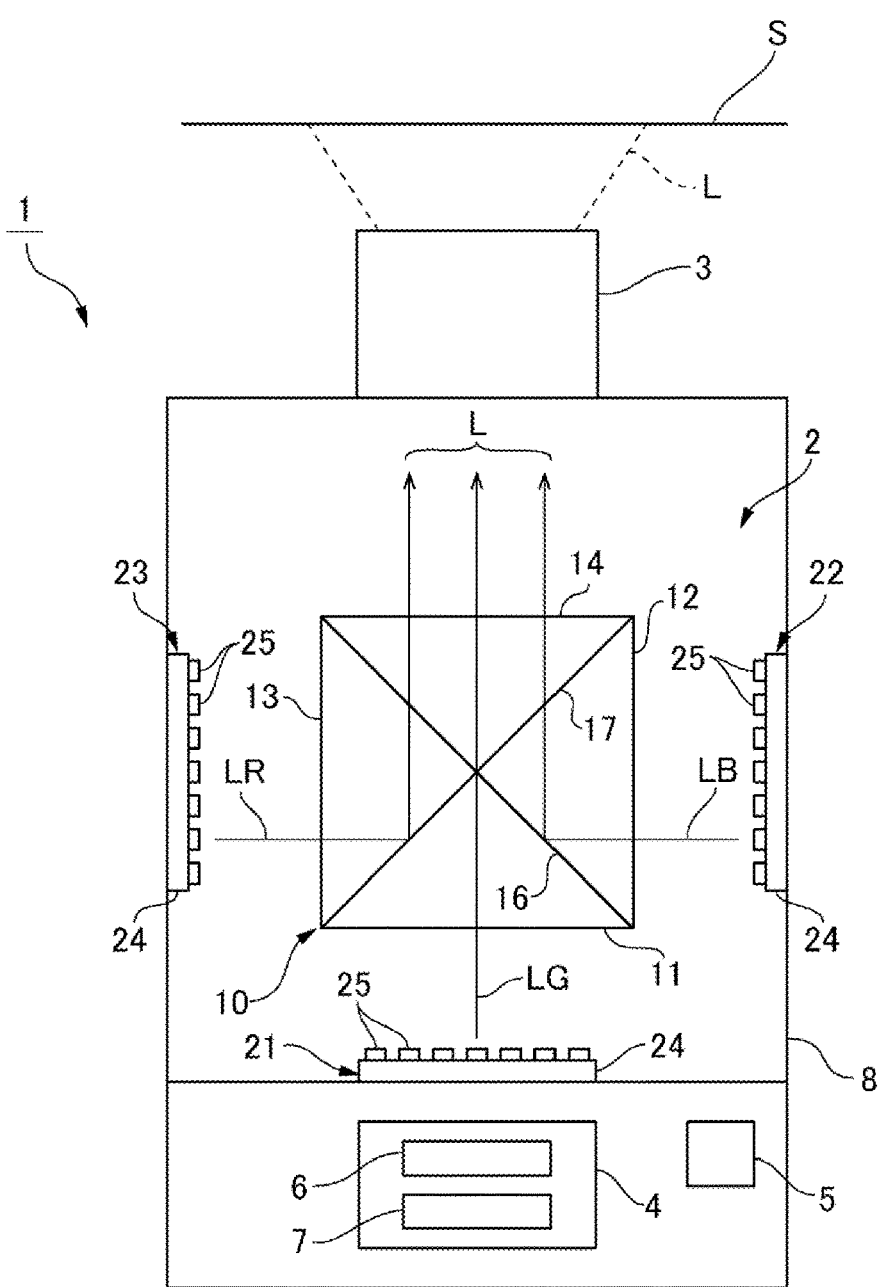
FIG. 1 is a schematic view of a projection device according to Embodiment 1.
Figure 1:
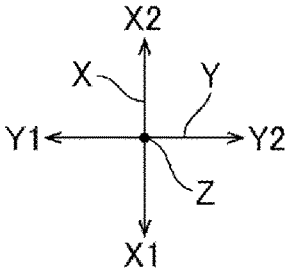

A projection device of the embodiment will now be described. FIG. 1 is a schematic diagram of the projection device according to Embodiment 1. As illustrated in FIG. 1, the projection device 1 according to Embodiment 1 includes an image forming unit 2 that emits image light L, a control unit 4 that controls the image forming unit 2, a projection optical system 3 that enlarges the image light L and projects and forms an image on a screen S that is a projection target, and a power supply unit 5. Each of the units is accommodated or installed in a housing 8. A battery or the like can be used as the power supply unit 5, and the image forming unit 2 does not require a separate light source and can be separated from other units. With these configurations, it is possible to realize a projection system capable of visually recognizing a high-quality image with a high luminance, a small size, and a light weight.

The image forming unit 2 includes a first self-luminous display device 21, a second self-luminous display device 22, and a third self-luminous display device 23. In this example, each of the self-luminous display devices is a display panel having a light-emitting element for each pixel. The light-emitting element is an organic light emitting diode (OLED). Each of the self-luminous display devices may also be a μLED. Each of the self-luminous display devices is the same member. Further, the image forming unit 2 includes a dichroic prism 10 for combining first image light LG having a first wavelength emitted from the first self-luminous display device 21, second image light LB having a second wavelength emitted from the second self-luminous display device 22, and third image light LR having a third wavelength emitted from the third self-luminous display device 23.

The control unit 4 includes an image processing unit 6 to which an image signal such as a video signal is input, and a display driving unit 7 that drives and controls the first self-luminous display device 21, the second self-luminous display device 22, and the third self-luminous display device 23 based on the image signal output from the image processing unit 6. The image processing unit 6 converts the input image signal into an image signal including tones of each color. The display driving unit 7 operates the first self-luminous display device 21, the second self-luminous display device 22, and the third self-luminous display device 23 based on projection image signals of the respective colors output from the image processing unit 6. When the first image light LG, the second image light LB, and the third image light LR are combined by the dichroic prism 10, the image light L corresponding to the image signal is formed. In this example, the first image light LG is green. The second image light LB is blue. The third image light LR is red. The first self-luminous display device 21, the second self-luminous display device 22, and the third self-luminous display device 23 emit green, blue, and red image light, respectively. Each of the self-luminous display devices surrounds the dichroic prism 10 in three directions. The projection optical system 3 is located on the side opposite to the first self-luminous display device 21 with the dichroic prism 10 interposed therebetween.

In the following description, the three directions orthogonal to each other are referred to as an X-axis direction, a Y-axis direction, and a Z-axis direction. FIG. 1 illustrates a case in which the image forming unit 2 is seen in the Z-axis direction. The X-axis direction is a direction in which the first self-luminous display device 21, the dichroic prism 10, and the projection optical system 3 are arranged. The Y direction is a direction in which the second self-luminous display device 22, the dichroic prism 10, and the third self-luminous display device 23 are arranged. In the X-axis direction, the side on which the first self-luminous display device 21 is located with respect to the dichroic prism 10 is referred to as an X1 direction, and the side on which the projection optical system 3 is located is referred to as an X2 direction. In the Y-axis direction, the side on which the second self-luminous display device 22 is located with respect to the dichroic prism 10 is referred to as a Y2 direction, and the side on which the third self-luminous display device 23 is located is referred to as a Y1 direction.

The dichroic prism 10 has a rectangular parallelepiped shape formed of four triangular prisms, and has a first surface 11, a second surface 12, a third surface 13, a fourth surface 14, a ceiling surface, and a bottom surface. The first surface 11 faces the fourth surface 14, and the second surface 12 faces the third surface 13. The second surface 12 and the third surface 13 are provided between the first surface 11 and the fourth surface. The other two facing surfaces are the ceiling surface and the bottom surface. The first surface 11 is located on the side of the first self-luminous display device 21 in the X2 direction. The first surface 11 faces the first self-luminous display device 21 in the X-axis direction. The second surface 12 is located on the side of the second self-luminous display device 22 in the Y1 direction. The second surface 12 faces the second self-luminous display device 22 in the Y-axis direction. The third surface 13 is located on the side of the third self-luminous display device 23 in the Y2 direction. The third surface 13 faces the third self-luminous display device 23 in the Y-axis direction. The fourth surface 14 is located on the side of the projection optical system 3 in the X1 direction. The fourth surface 14 faces the projection optical system 3 in the X-axis direction. Each of the four triangular prisms is a triangular prism extending in the Z-axis direction, and is joined at a joint surface to form a cubic dichroic prism 10.

The dichroic prism 10 has a first dichroic film 16 and a second dichroic film 17. The first dichroic film 16 and the second dichroic film 17 are disposed so as to intersect each other at an angle of 90°. Each of the first dichroic film 16 and the second dichroic film 17 is provided on the joint surface on which two triangular prisms are joined to each other. The first dichroic film 16 is formed to be inclined from the X1 direction to the Y2 direction. The second dichroic film 17 is formed to be inclined from the X1 direction to the Y1 direction.

The first self-luminous display device 21 emits the first image light LG toward the first dichroic film 16 and the second dichroic film 17 via the first surface 11 in the X2 direction. The second self-luminous display device 22 emits the second image light LB toward the first dichroic film 16 via the second surface 12 in the Y1 direction. The third self-luminous display device 23 emits the third image light LR toward the second dichroic film 17 via the third surface 13 in the Y2 direction.

Figure 2:
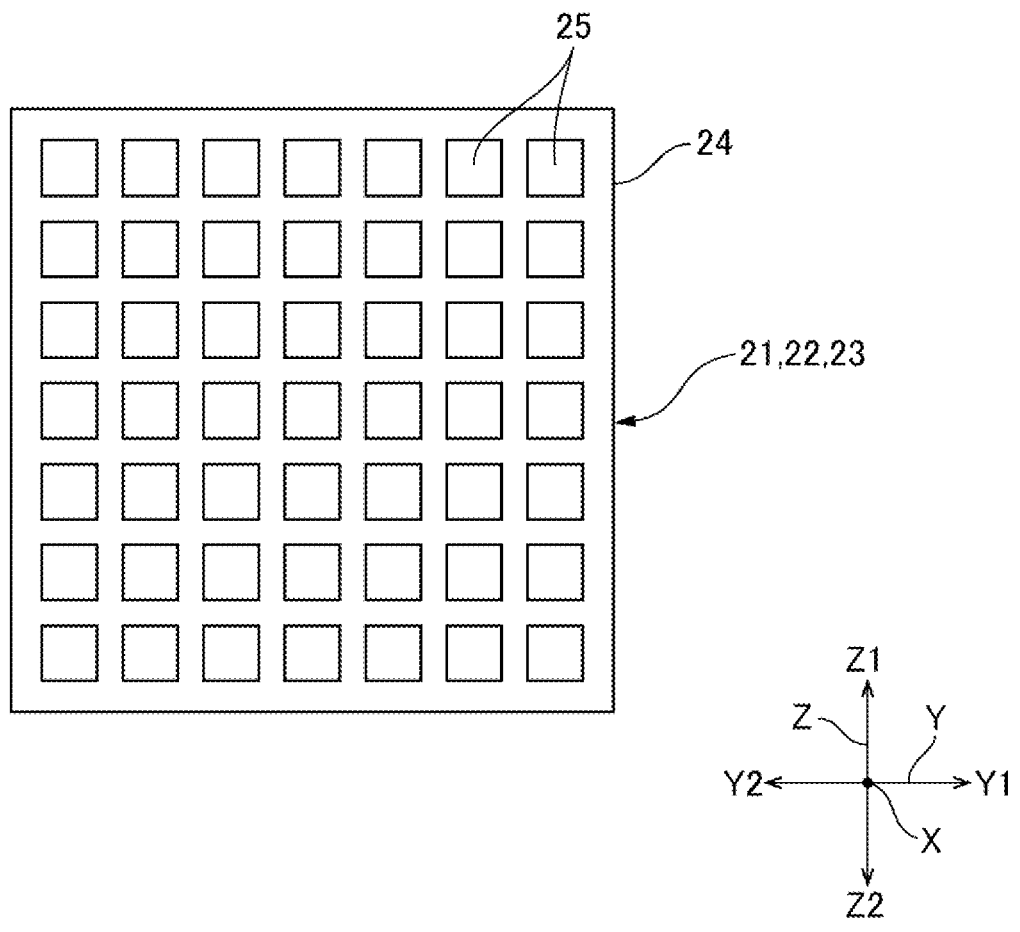
FIG. 2 is a schematic front view of a self-luminous display device.
Figure 3:
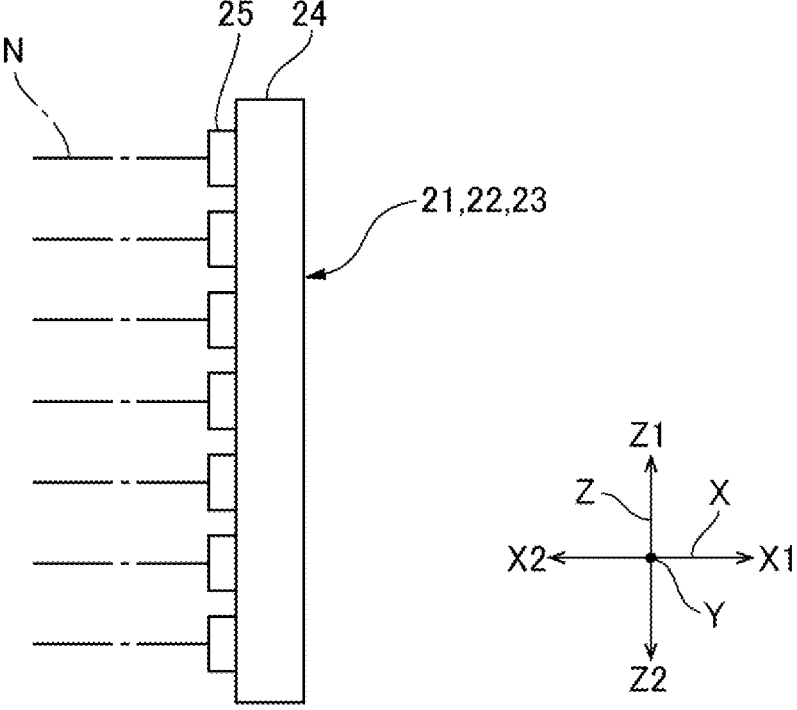
FIG. 3 is a schematic view of the self-luminous display device seen from the side.

FIG. 2 is a schematic front view of a light emitting display surface of the first self-luminous display device 21 when seen in the X1 direction. FIG. 3 is a schematic side view of the first self-luminous display device 21 when seen in the Y2 direction. As illustrated in FIGS. 2 and 3, the first self-luminous display device 21 includes a substrate 24 and a plurality of light-emitting elements 25 arranged in a matrix on the substrate 24. An optical axis N of each of the light-emitting elements 25 is perpendicular to the substrate 24. In other words, the optical axes N of the light-emitting elements 25 are parallel to each other. Each of the light-emitting elements 25 emits light. The second self-luminous display device 22 and the third self-luminous display device 23 have the same configuration.

When light is emitted from each of the first self-luminous display device 21, the second self-luminous display device 22, and the third self-luminous display device 23, the first dichroic film 16 transmits the first image light LG and the third image light LR. Further, the first dichroic film 16 reflects the second image light LB in the X2 direction. The second dichroic film 17 transmits the first image light LG and the second image light LB. Further, the second dichroic film 17 reflects the third image light LR in the X2 direction.

The first image light LG from the first self-luminous display device 21 and the second image light LB from the second self-luminous display device 22 are combined by the first dichroic film 16 and travel in the X2 direction. Further, the first image light LG from the first self-luminous display device 21 and the third image light LR from the third self-luminous display device 23 are combined by the second dichroic film 17. The combined light by the first dichroic film 16 and the second dichroic film 17 is superimposed and becomes the image light L traveling in the X2 direction. The image light L is incident on the projection optical system 3.

Figure 4:
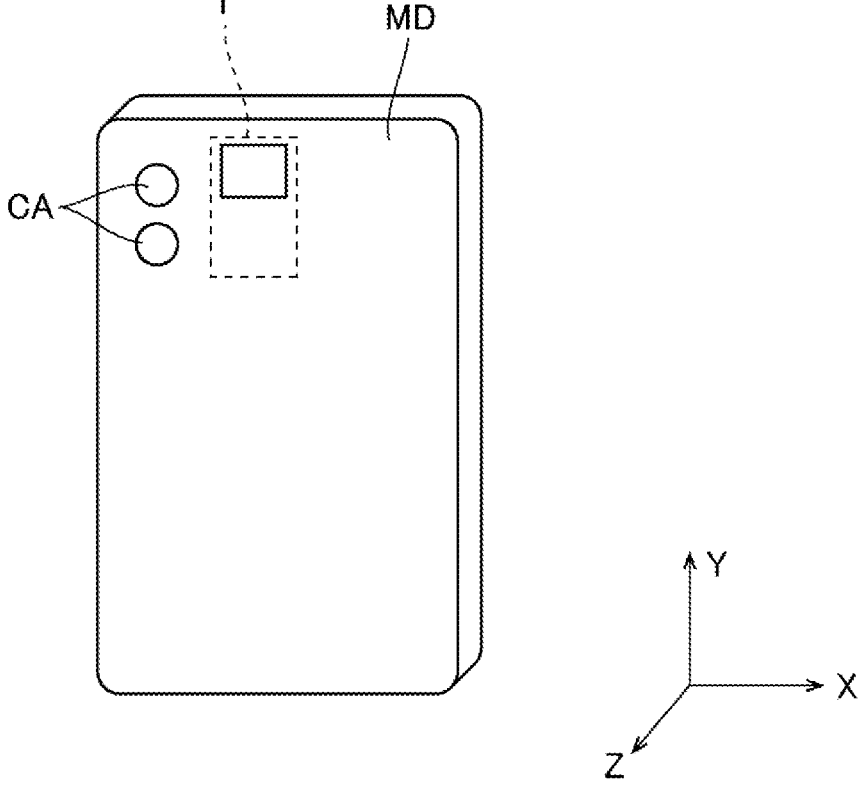
FIG. 4 is a schematic diagram of an example of a projection system including a projection device.

The display panel is a self-luminous display device capable of emitting light with high luminance, and does not require a separate light source or a large power supply unit for supplying electric power to the light source, and thus the projection device 1 can be reduced in size and weight as a whole. For example, as illustrated in FIG. 4, it is possible to adopt a mode in which the projection device 1 is applied to a thin portable device MD such as a smartphone equipped with various devices such as a camera CA to perform image projection.

Figure 5:
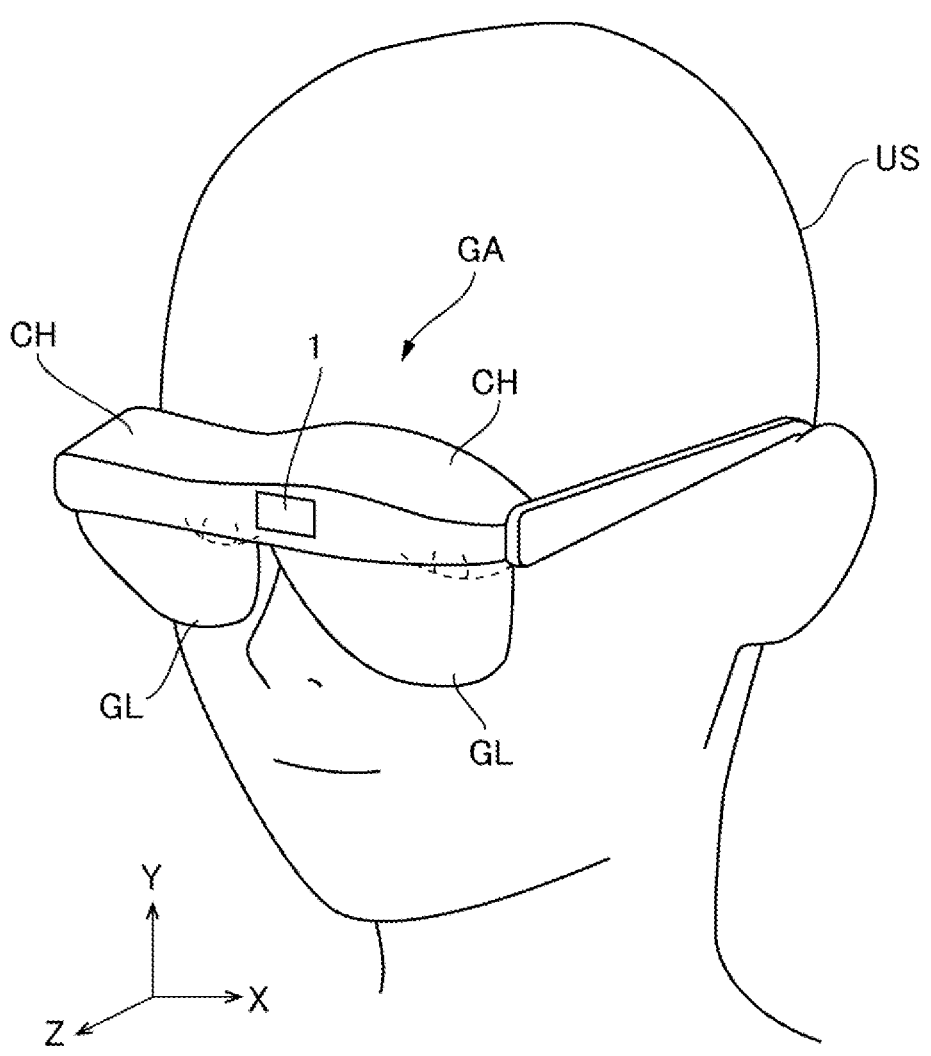
FIG. 5 is a schematic view of another example of the projection system including the projection device.

In addition, as illustrated in FIG. 5, it is possible to adopt a mode in which the projection device 1 can be easily installed in glasses GA worn by an observer or a wearer US, and the image projection can be performed in a real space in front of the line of sight of the observer or the wearer US. Further, the glasses GA can be configured as a head-up display by adding a switching mechanism CH capable of performing the image projection from the projection device 1 to glasses lenses GL of the glasses GA.

Figure 6:
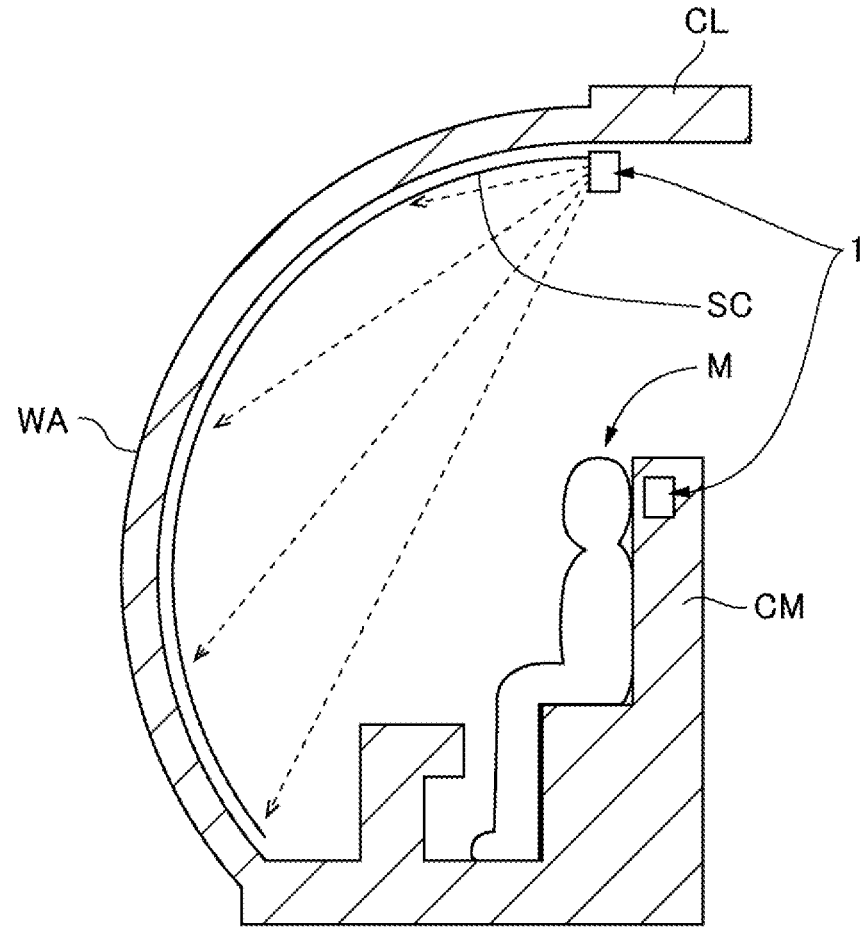
FIG. 6 is a schematic vertical cross-sectional view of yet another example of the projection system including the projection device.
Figure 7:
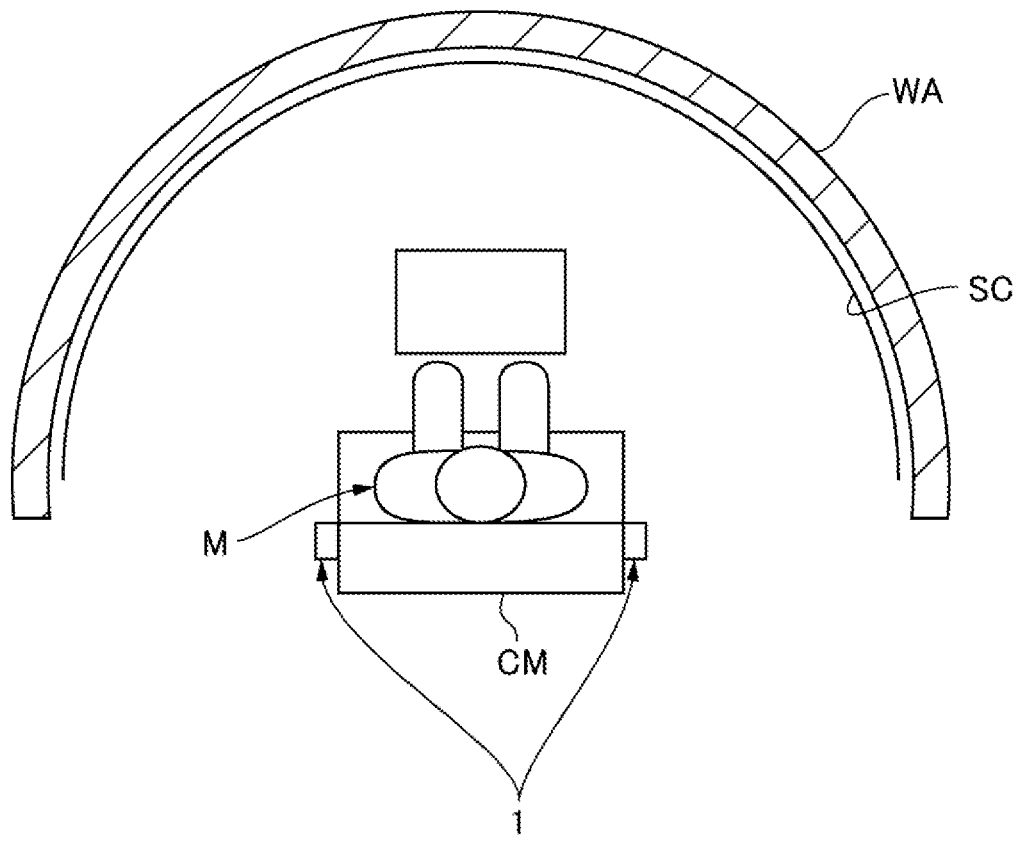
FIG. 7 is a schematic horizontal cross-sectional view of a projection system corresponding to FIG. 6.

In addition, as illustrated in FIGS. 6 and 7, a degree of freedom of installation of the projection device 1 is increased for a viewer M, and installation is facilitated. The projection device 1 can be easily installed on a seating portion CM of the viewer M or a ceiling CL, and the viewer M can visually recognize an image using a wall WA as a screen SC. The seating portion CM may be a driver's seat of an automobile.

In addition, in a portable device MD, it is possible to detect a position of the screen SC and to sense a shape of a projection surface using a camera CA, and it is possible to provide a display image with high quality. In addition, a photodetector can be incorporated in the self-luminous display device and can have the same function as the camera CA.

Embodiment 2

Figure 8:
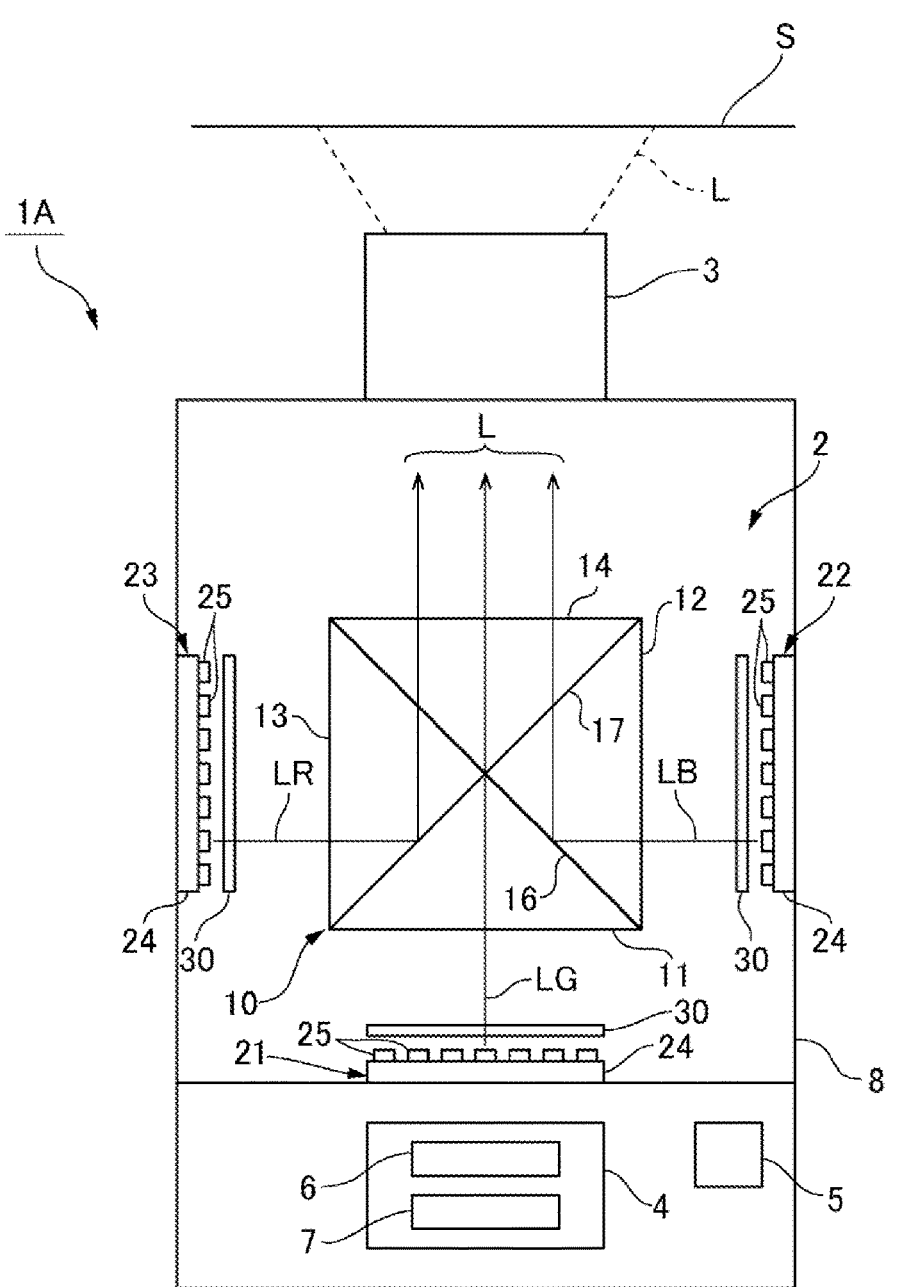
FIG. 8 is an explanatory diagram of a projection device according to Embodiment 2.
Figure 8:
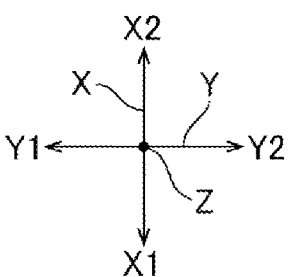
Figure 9:
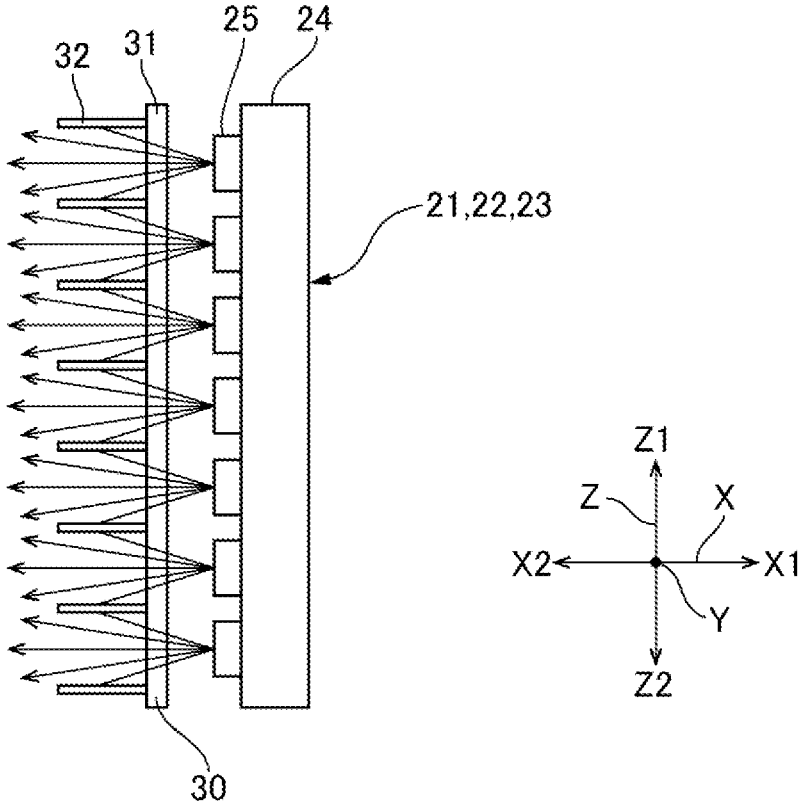
FIG. 9 is an explanatory diagram of an angle limiting filter.

Next, Embodiment 2 will be described. FIG. 8 is an explanatory diagram of a projection device according to Embodiment 2. FIG. 9 is an explanatory diagram of an angle limiting filter. A projection device 1A of Embodiment 2 is different from the projection device 1 of Embodiment 1 in that three angle limiting filters are provided. Since the other configurations of the projection device 1A of Embodiment 2 are identical to those of the projection device 1 of Embodiment 1, the corresponding configurations are designated by the same symbols, and the description thereof will be omitted.

As illustrated in FIG. 8, in the image forming unit 2, the first self-luminous display device 21, the second self-luminous display device 22, and the third self-luminous display device 23 surround the dichroic prism 10 from three directions. The projection optical system 3 is located on the side opposite to the first self-luminous display device 21 with the dichroic prism 10 interposed therebetween.

In this example, in the image forming unit 2, the angle limiting filter 30 is disposed between the first self-luminous display device 21 and the first surface 11, between the second self-luminous display device 22 and the second surface 12, and between the third self-luminous display device 23 and the third surface 13.

For example, as illustrated in FIG. 9, the angle limiting filter 30 includes a glass plate 31 and a resin lattice structure 32 provided on one surface of the glass plate 31. The lattice structure 32 narrows a light distribution angle of light emitted from each of the light-emitting elements 25 in front of each of the light-emitting elements 25 of the self-luminous display device. Thus, the light distribution angle of the first image light LG of the first self-luminous display device 21 is narrowed. The light distribution angle of the second image light LB of the second self-luminous display device 22 is narrowed. In addition, the light distribution angle of the third image light LR of the third self-luminous display device 23 is narrowed.

Figure 10:
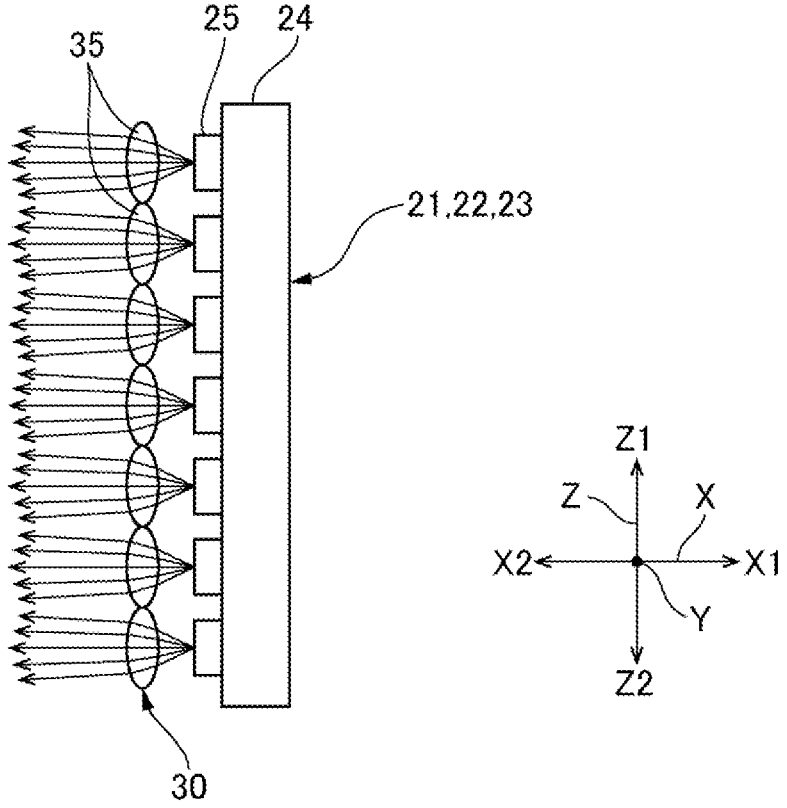
FIG. 10 is a diagram illustrating another example of the angle limiting filter.

FIG. 10 shows another example of the angle limiting filter 30. As illustrated in FIG. 10, the angle limiting filter 30 of this example includes a plurality of lenses 35 arranged in a matrix. The plurality of lenses 35 refract light emitted from each of the light-emitting elements 25 of the self-luminous display devices to narrow the light distribution angle.

According to this example, the image light emitted from each of the three self-luminous display devices is superimposed by the two dichroic films and is then emitted from the fourth surface 14 of the dichroic prism 10. Here, peripheral light of the image light emitted from each of the self-luminous display devices diffuses while passing through the dichroic prism 10, and is reflected by other surfaces of the dichroic prism before reaching the fourth surface 14. Further, such peripheral light is emitted from the fourth surface 14 of the dichroic prism 10 and then becomes stray light. On the other hand, in this example, the angle limiting filter 30 for narrowing the light distribution angle of the image light emitted from the light-emitting element 25 of each of the self-luminous display devices is provided between each of the self-luminous display devices and the dichroic prism 10. Therefore, in the image light emitted from each of the three self-luminous display devices, the peripheral light reflected by other surfaces inside the dichroic prism 10 before reaching the fourth surface 14 of the dichroic prism 10 can be reduced. Therefore, generation of stray light caused by reflection in the dichroic prism 10 can be prevented.

Embodiment 3

Figure 11:
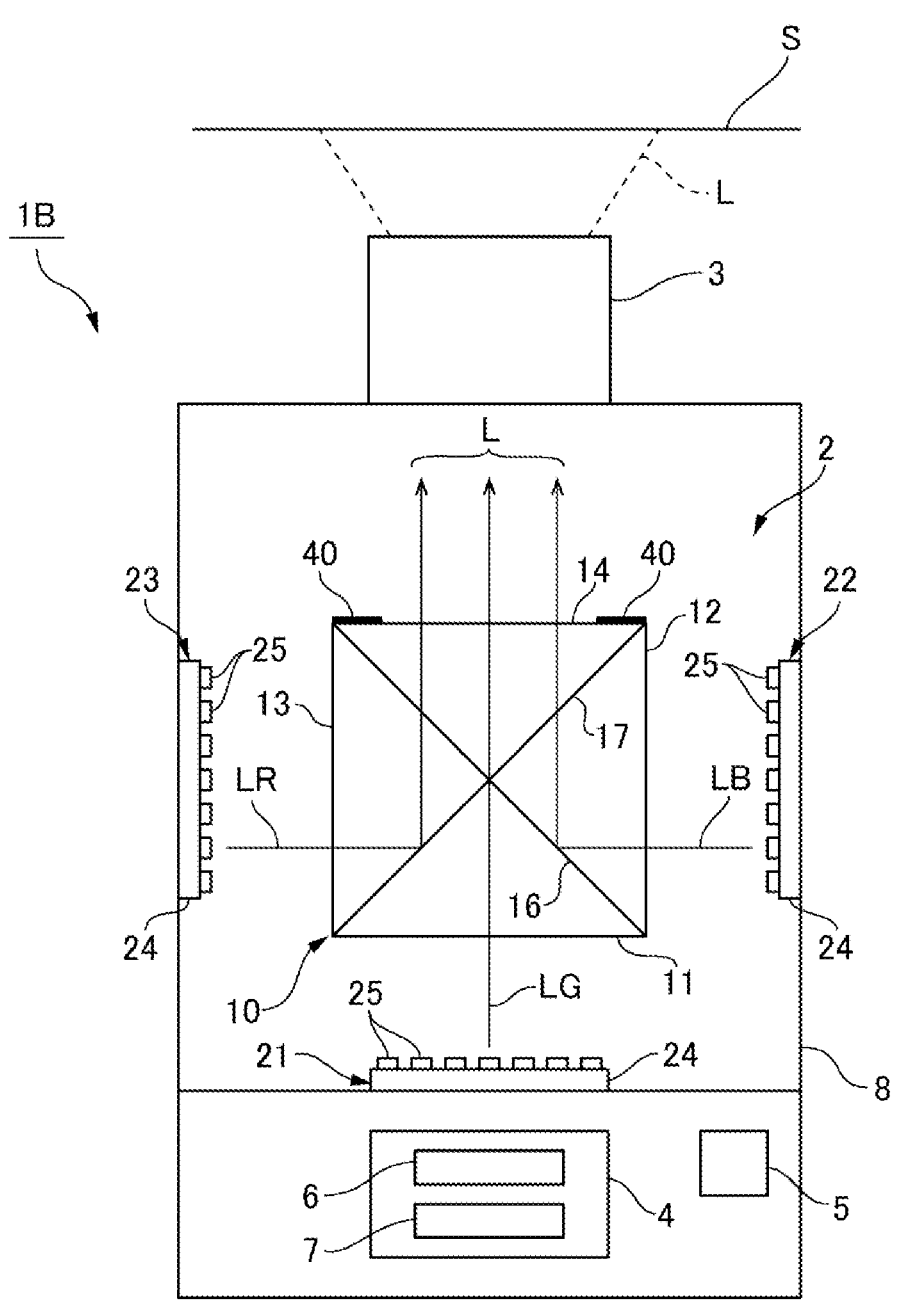
FIG. 11 is a diagram for describing a projection device according to Embodiment 3.
Figure 11:
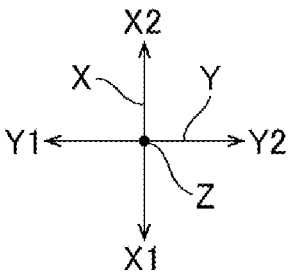
Figure 12:
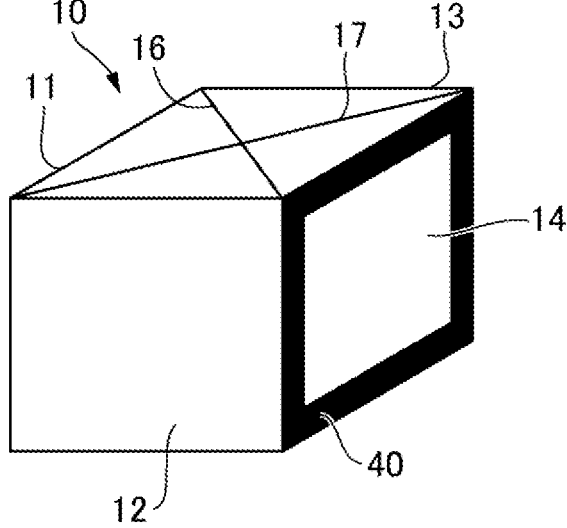
FIG. 12 is a diagram for describing a light absorbing member provided on a fourth surface of a dichroic prism.
Figure 12:
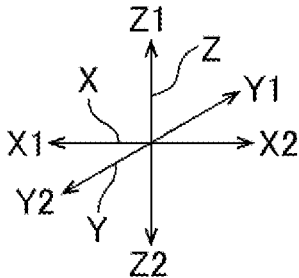

Next, Embodiment 3 will be described. FIG. 11 is a diagram for describing a projection device according to Embodiment 3. FIG. 12 is a diagram illustrating a light absorbing member provided on the fourth surface of the dichroic prism. The projection device 1B of Embodiment 3 is different from the projection device 1 of Embodiment 1 in the configuration of the dichroic prism 10. Since the other configurations of the projection device 1B of Embodiment 3 are identical to those of the projection device 1 of Embodiment 1, the corresponding configurations are designated by the same symbols, and the description thereof will be omitted.

As illustrated in FIG. 11, in the image forming unit 2, the first self-luminous display device 21, the second self-luminous display device 22, and the third self-luminous display device 23 surround the dichroic prism 10 from three directions. The projection optical system 3 is located on the side opposite to the first self-luminous display device 21 with the dichroic prism 10 interposed therebetween.

As illustrated in FIGS. 11 and 12, a frame-shaped light absorbing member 40 is provided on an outer peripheral edge of the fourth surface 14 of the dichroic prism 10. The light absorbing member 40 absorbs the first image light LG, the second image light LB, and the third image light LR.

According to this example, the image light emitted from each of the three self-luminous display devices is superimposed by the two dichroic films and is emitted from the fourth surface 14 of the dichroic prism 10. Here, the peripheral light of the projection light emitted from each of the self-luminous display devices diffuses while passing through the dichroic prism 10, and is reflected by other surfaces of the dichroic prism before reaching the fourth surface 14. Further, such peripheral light is emitted from the fourth surface 14 of the dichroic prism 10 and then becomes stray light. On the other hand, in this example, the frame-shaped light absorbing member 40 is provided at the outer peripheral edge of the fourth surface 14. As a result, in the image light emitted from each of the three self-luminous display devices, the light reaching the fourth surface 14 of the dichroic prism 10 after being reflected by other surfaces of the dichroic prism 10 being emitted from the fourth surface 14 can be suppressed. Therefore, the peripheral light of the image light L not entering the projection optical system 3 and becoming stray light can be suppressed.

Also in this example, the three angle limiting filters of Embodiment 2 may be provided. In this way, in the image light emitted from each of the three self-luminous display devices, it is possible to reduce the peripheral light reflected by other surfaces in the dichroic prism 10 before reaching the fourth surface 14 of the dichroic prism 10. Therefore, generation of stray light caused by reflection in the dichroic prism 10 can be prevented.

Embodiment 4

Figure 13:
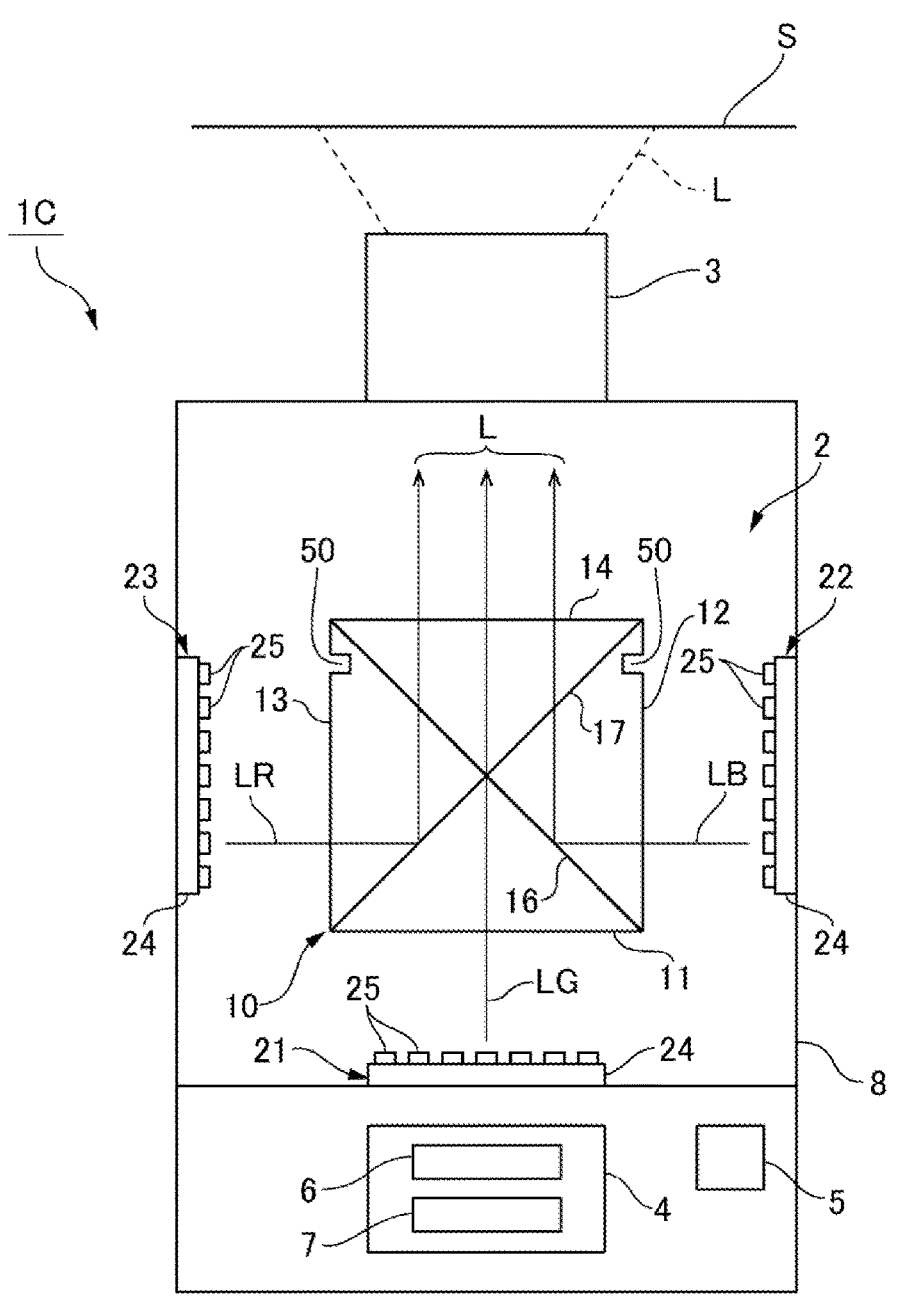
FIG. 13 is a diagram illustrating a projection device according to Embodiment 4.
Figure 13:
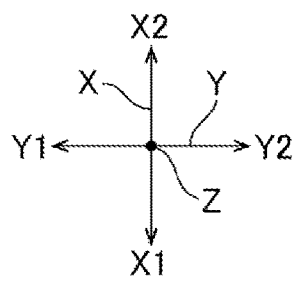
Figure 14:
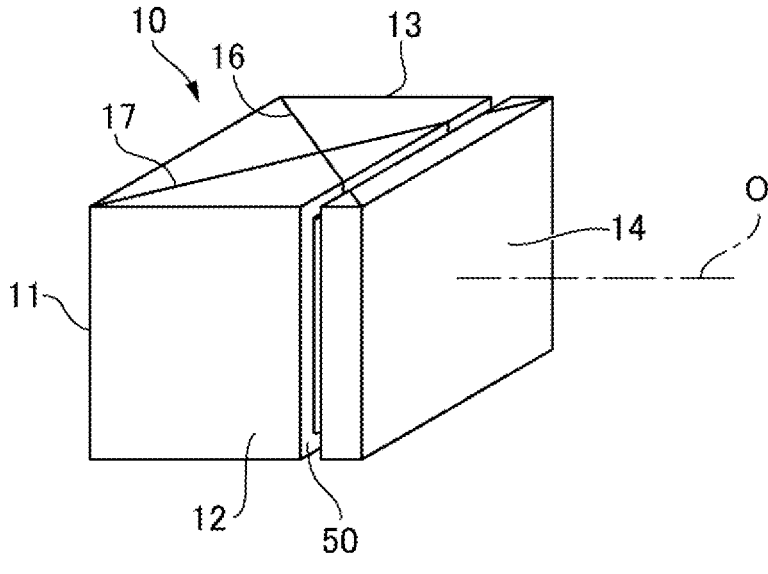
FIG. 14 is a diagram illustrating a dichroic prism according to Embodiment 4.
Figure 14:
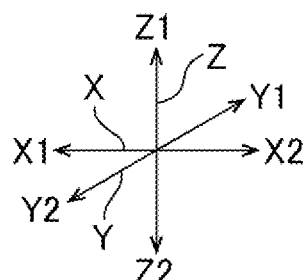

Next, Embodiment 4 will be described. FIG. 13 is a diagram for describing a projection device of Embodiment 4. FIG. 14 is a diagram for describing a dichroic prism according to Embodiment 4. A projection device 1C of Embodiment 4 is different from the projection device 1 of Embodiment 1 in the configuration of the dichroic prism 10.

Since the other configurations of the projection device 1C of Embodiment 4 are identical to those of the projection device 1 of Embodiment 1, the corresponding configurations are designated by the same symbols, and the description thereof will be omitted.

As illustrated in FIG. 13, in the image forming unit 2, the first self-luminous display device 21, the second self-luminous display device 22, and the third self-luminous display device 23 surround the dichroic prism 10 from three directions. The projection optical system 3 is located on the side opposite to the first self-luminous display device 21 with the dichroic prism 10 interposed therebetween.

As illustrated in FIGS. 13 and 14, an optical axis direction along an optical axis O of the image light L emitted from the fourth surface 14 of the dichroic prism 10 coincides with the X-axis direction. In other words, the first surface 11 and the fourth surface 14 of the dichroic prism 10 face each other in the optical axis direction. An annular groove 50 surrounding the optical axis O is provided at a position closer to the fourth surface 14 than to the first surface 11 in an annular outer peripheral surface surrounding the optical axis O in the dichroic prism 10.

According to this example, the image light emitted from each of the three self-luminous display devices is superimposed by the two dichroic films and is emitted from the fourth surface 14 of the dichroic prism 10. Here, the peripheral light of the image light emitted from each of the self-luminous display devices diffuses while passing through the dichroic prism 10, and is reflected by other surfaces of the dichroic prism 10 before reaching the fourth surface 14. Further, such peripheral light is emitted from the fourth surface 14 of the dichroic prism 10 and then becomes stray light. On the other hand, in this example, the annular groove 50 surrounding the optical axis O is provided at a position closer to the fourth surface 14 than the first surface 11 in the annular outer peripheral surface surrounding the optical axis O in the dichroic prism 10. Thus, in the image light emitted from each of the three self-luminous display devices, the light reflected by the other surfaces in the dichroic prism 10 before reaching the fourth surface 14 of the dichroic prism 10 is prevented from reaching the fourth surface 14 due to the annular groove 50. Therefore, the peripheral light of the image light L not entering the projection optical system 3 and becoming stray light can be suppressed.

Also in this example, the three angle limiting filters of Embodiment 2 may be provided. In this way, in the image light emitted from each of the three self-luminous display devices, it is possible to reduce the peripheral light reflected by other surfaces in the dichroic prism 10 before reaching the fourth surface 14 of the dichroic prism 10. Therefore, generation of stray light caused by reflection in the dichroic prism 10 can be prevented.

Also in this example, the light absorbing member 40 of Embodiment 3 may be provided. Therefore, the peripheral light of the image light L not entering the projection optical system 3 and becoming stray light can be further suppressed.

Embodiment 5

Figure 15:
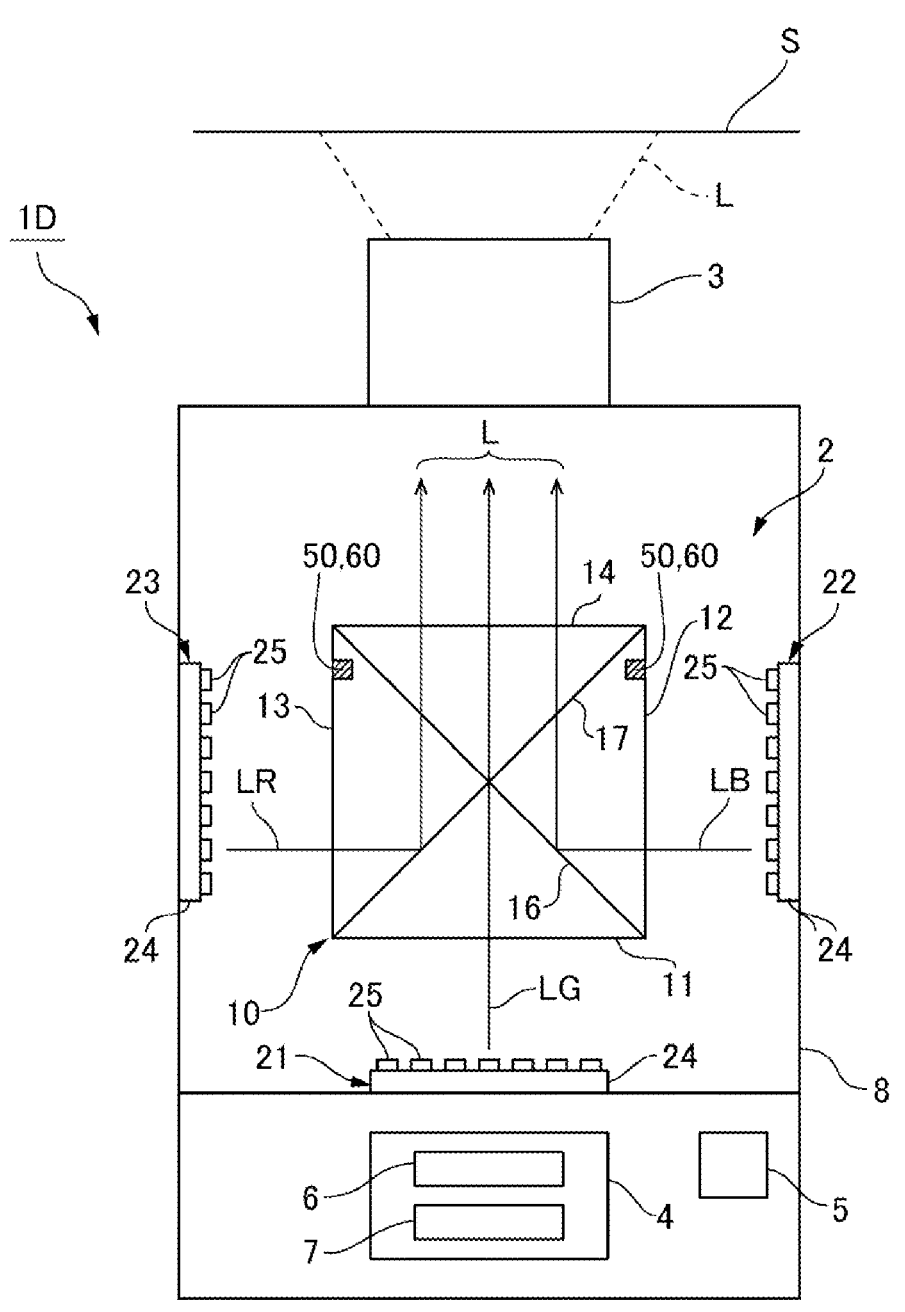
FIG. 15 is a diagram for describing a projection device according to Embodiment 5.
Figure 15:
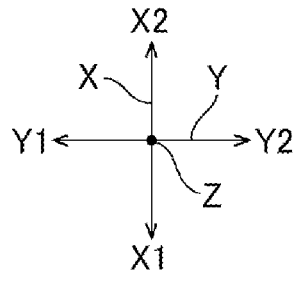
Figure 16:
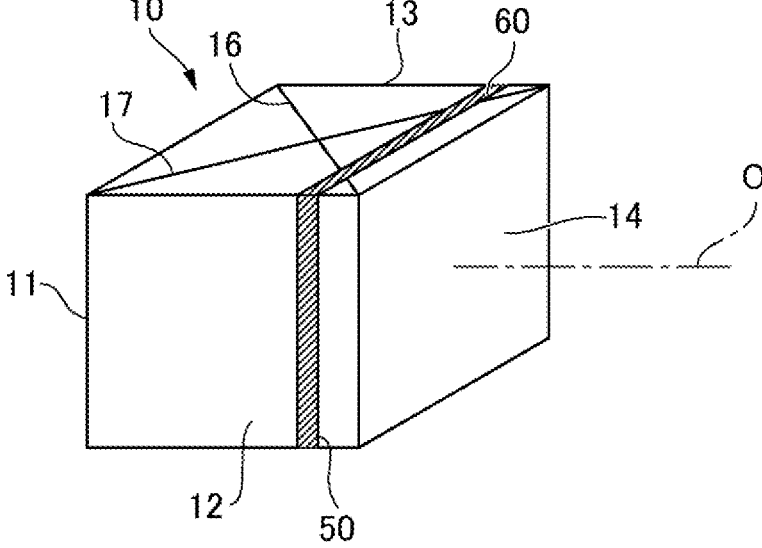
FIG. 16 is a diagram for describing a dichroic prism according to Embodiment 5.
Figure 16:
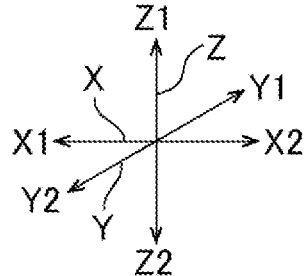

Next, Embodiment 5 will be described. FIG. 15 is a diagram for describing a projection device according to Embodiment 5. FIG. 16 is a diagram for describing a dichroic prism according to Embodiment 5. A projection device 1D of Embodiment 5 is different from the projection device 1 of Embodiment 1 in the configuration of the dichroic prism 10. Since the other configurations of the projection device 1D of Embodiment 5 are identical to those of the projection device 1 of Embodiment 1, the corresponding configurations are designated by the same symbols, and the description thereof will be omitted.

As illustrated in FIG. 15, in the image forming unit 2, the first self-luminous display device 21, the second self-luminous display device 22, and the third self-luminous display device 23 surround the dichroic prism 10 from three directions. The projection optical system 3 is located on the side opposite to the first self-luminous display device 21 with the dichroic prism 10 interposed therebetween.

As illustrated in FIGS. 15 and 16, the optical axis direction along the optical axis O of the image light L emitted from the fourth surface 14 of the dichroic prism 10 coincides with the X-axis direction. In other words, the first surface 11 and the fourth surface 14 of the dichroic prism 10 face each other in the optical axis direction. An annular groove 50 surrounding the optical axis O is provided at a position closer to the fourth surface 14 than to the first surface 11 in an annular outer peripheral surface surrounding the optical axis O in the dichroic prism 10.

A light absorbing member 60 is provided in the annular groove 50. The light absorbing member 60 absorbs the first image light LG, the second image light LB, and the third image light LR.

According to this example, the image light emitted from each of the three self-luminous display devices is superimposed by the two dichroic films and is emitted from the fourth surface 14 of the dichroic prism 10. Here, the peripheral light of the image light emitted from each of the self-luminous display devices diffuses while passing through the dichroic prism 10, and is reflected by other surfaces of the dichroic prism 10 before reaching the fourth surface 14. Further, such peripheral light is emitted from the fourth surface 14 of the dichroic prism 10 and then becomes stray light. On the other hand, in this example, the annular groove 50 surrounding the optical axis O is provided at a position closer to the fourth surface 14 than the first surface 11 in the annular outer peripheral surface surrounding the optical axis O in the dichroic prism 10. Thus, in the image light emitted from each of the three self-luminous display devices, the light reflected by the other surfaces in the dichroic prism 10 before reaching the fourth surface 14 of the dichroic prism 10 is prevented from reaching the fourth surface 14 due to the annular groove 50. Therefore, the peripheral light of the image light L not entering the projection optical system 3 and becoming stray light can be suppressed.

Further, in this example, the light absorbing member 60 is provided in the annular groove 50. The light absorbing member 60 absorbs the first image light LG, the second image light LB, and the third image light LR. Thus, in the image light emitted from each of the three self-luminous display devices, the light reflected by other surfaces in the dichroic prism 10 before reaching the fourth surface 14 of the dichroic prism 10 is prevented from reaching the fourth surface 14 due to the light absorbing member 60. Therefore, the peripheral light of the image light L not entering the projection optical system 3 and becoming stray light can be further suppressed.

Also in this example, the three angle limiting filters of Embodiment 2 may be provided. In this way, in the image light emitted from each of the three self-luminous display devices, it is possible to reduce the peripheral light reflected by other surfaces in the dichroic prism 10 before reaching the fourth surface 14 of the dichroic prism 10. Therefore, generation of stray light caused by reflection in the dichroic prism 10 can be prevented.

Also in this example, the light absorbing member 40 of Embodiment 3 may be provided. Therefore, it is possible to further suppress the peripheral light of the image light L from not entering the projection optical system 3 and becoming stray light.

Embodiment 6

Figure 17:
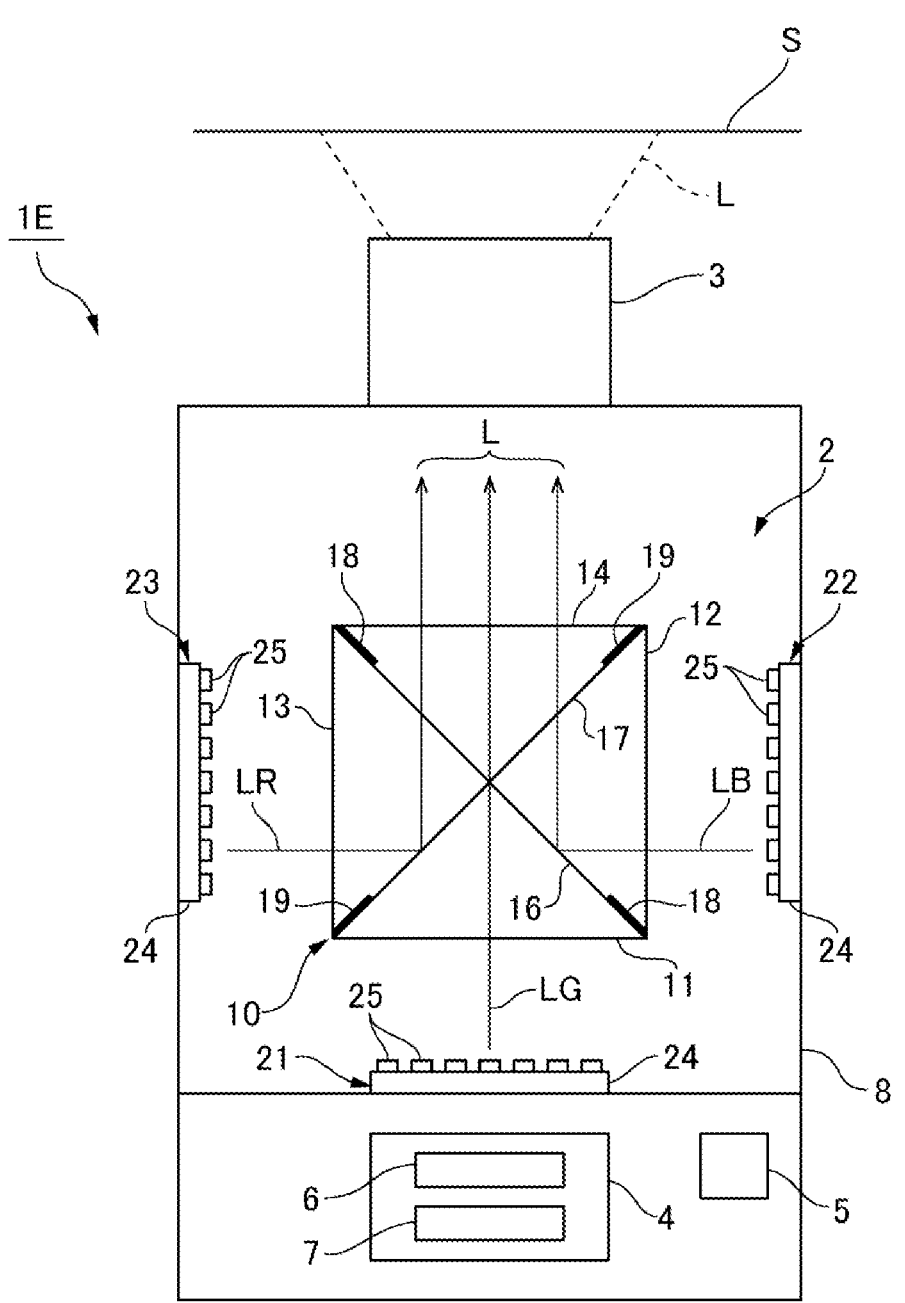
FIG. 17 is a diagram for describing a projection device according to Embodiment 6.
Figure 17:
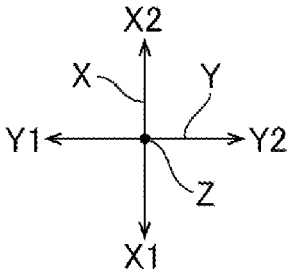

Next, Embodiment 6 will be described. FIG. 17 is a diagram for describing a projection device according to Embodiment 6. A projection device 1E of Embodiment 6 is different from the projection device 1 of Embodiment 1 in the configuration of the dichroic prism 10. Since the other configurations of the projection device 1E of Embodiment 6 are identical to those of the projection device 1 of Embodiment 1, the corresponding configurations are designated by the same symbols, and the description thereof will be omitted.

As illustrated in FIG. 17, in the image forming unit 2, the first self-luminous display device 21, the second self-luminous display device 22, and the third self-luminous display device 23 surround the dichroic prism 10 from three directions. The projection optical system 3 is located on the side opposite to the first self-luminous display device 21 with the dichroic prism 10 interposed therebetween.

The dichroic prism 10 has a first dichroic film 16 and a second dichroic film 17. The first dichroic film 16 and the second dichroic film 17 are disposed so as to intersect each other at an angle of 90°. The first dichroic film 16 and the second dichroic film 17 are provided on a joint surface on which the four triangular prisms are joined to each other. The first dichroic film 16 is inclined in the Y2 direction toward the X1 direction. The second dichroic film 17 is inclined in the Y1 direction toward the X1 direction.

A frame-shaped first light absorbing layer 18 that absorbs the peripheral light of the first image light LG and the peripheral light of the second image light LB is provided on the first dichroic film 16. The first light absorbing layer 18 may absorb the first image light LG, the second image light LB, and the third image light LR.

A frame-shaped second light absorbing layer 19 that absorbs the peripheral light of the first image light LG and the peripheral light of the third image light LR is provided on the second dichroic film 17. The second light absorbing layer 19 may absorb the first image light LG, the second image light LB, and the third image light LR.

According to this example, the image light emitted from each of the three self-luminous display devices is superimposed by the two dichroic films and is emitted from the fourth surface 14 of the dichroic prism 10. Here, the peripheral light of the image light emitted from each of the self-luminous display devices diffuses while passing through the dichroic prism 10, and is reflected by other surfaces of the dichroic prism 10 before reaching the fourth surface 14. Further, such peripheral light is emitted from the fourth surface 14 of the dichroic prism 10 and then becomes stray light. On the other hand, in this example, the frame-shaped first light absorbing layer 18 that absorbs the peripheral light of the first image light LG and the peripheral light of the second image light LB is provided on the first dichroic film 16. Further, the frame-shaped second light absorbing layer 19 that absorbs the peripheral light of the first image light LG and the peripheral light of the third image light LR is provided on the second dichroic film 17. Therefore, in the image light emitted from each of the three self-luminous display devices, the peripheral light reflected by other surfaces inside the dichroic prism 10 before reaching the fourth surface 14 of the dichroic prism 10 can be reduced. Therefore, generation of stray light caused by reflection in the dichroic prism 10 can be prevented.

Also in this example, the three angle limiting filters of Embodiment 2 may be provided. In this way, in the image light emitted from each of the three self-luminous display devices, it is possible to reduce the peripheral light reflected by other surfaces in the dichroic prism 10 before reaching the fourth surface 14 of the dichroic prism 10. Therefore, generation of stray light caused by reflection in the dichroic prism 10 can be prevented.

Also in this example, the light absorbing member 40 of Embodiment 3 may be provided. Therefore, the peripheral light of the image light L not entering the projection optical system 3 and becoming stray light can be further suppressed.

Also in this example, the annular groove 50 of Embodiment 4 may be provided. In addition, the light absorbing member 60 of Embodiment 5 may be provided. Thus, in the image light emitted from each of the three self-luminous display devices, the light reflected by other surfaces in the dichroic prism 10 before reaching the fourth surface 14 of the dichroic prism 10 is prevented from reaching the fourth surface 14 due to the annular groove 50 and the light absorbing member 60. Therefore, the peripheral light of the image light L not entering the projection optical system 3 and becoming stray light can be further suppressed.

Modified Example 1

Figure 18:
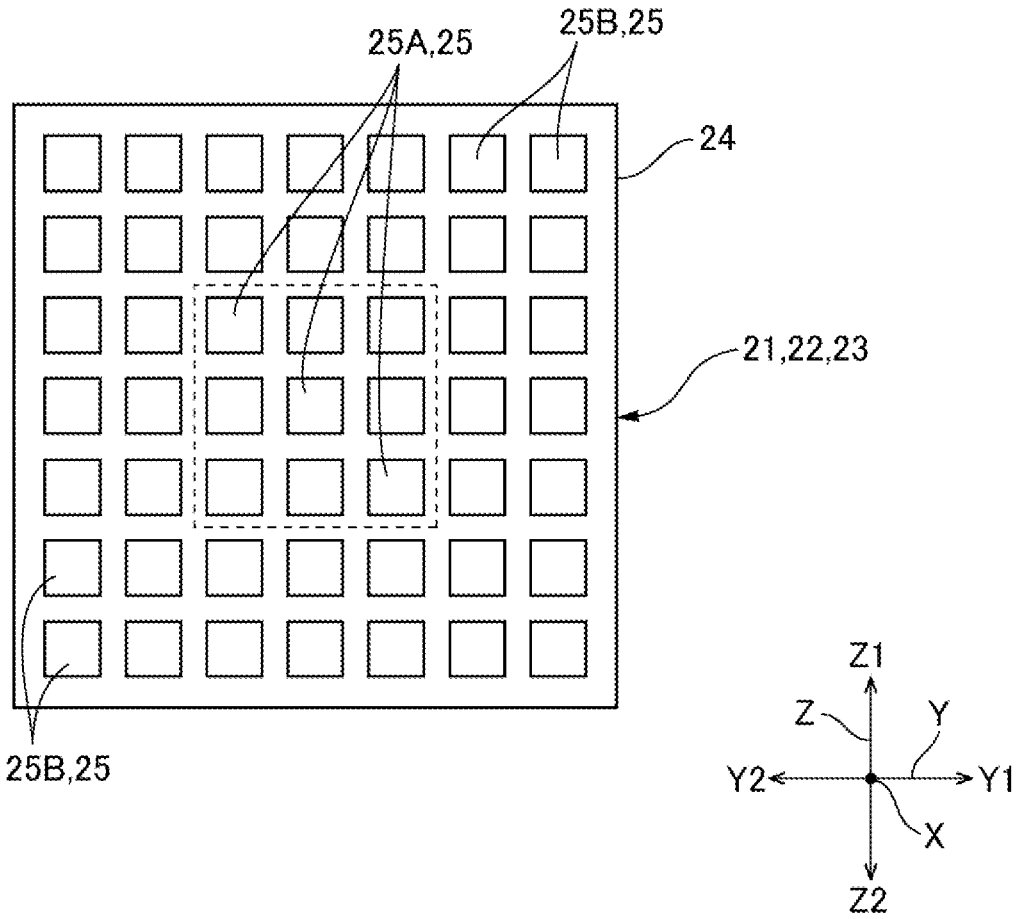
FIG. 18 is an explanatory diagram of a self-luminous display device having an in-plane angular distribution when seen from the front.
Figure 19:
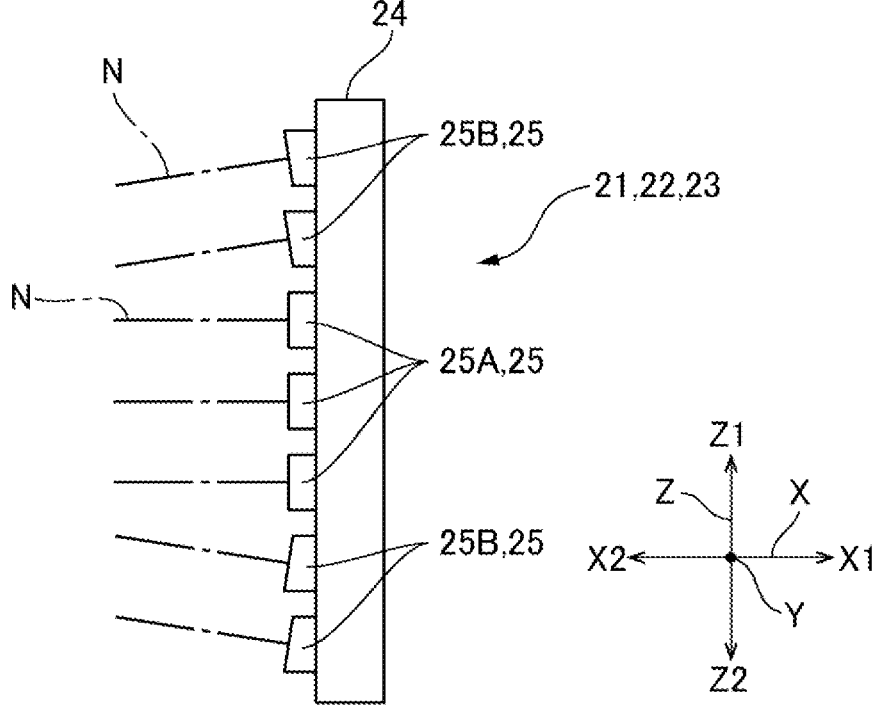
FIG. 19 is an explanatory diagram of the self-luminous display device having the in-plane angular distribution when seen from a side.

In Embodiments 3 to 6, each of the first self-luminous display device 21, the second self-luminous display device 22, and the third self-luminous display device 23 may have an in-plane angular distribution. FIG. 18 is an explanatory diagram of a self-luminous display device having an in-plane angular distribution seen from the front. FIG. 19 is a side view of the self-luminous display device having the in-plane angular distribution.

As illustrated in FIGS. 18 and 19, each of the self-luminous display devices includes a substrate 24 and a plurality of light-emitting elements 25 arranged in a matrix on the substrate. Among the plurality of light-emitting elements 25, optical axes N of the plurality of inner side light-emitting elements 25A arranged in a matrix at the central portion are perpendicular to the substrate. Among the plurality of light-emitting elements 25, optical axes N of a plurality of outer peripheral side light-emitting elements 25B arranged in a frame shape on the outer peripheral side of the plurality of inner side light-emitting elements 25A are inclined to the inner peripheral side.

In Embodiment 3, when a self-luminous display device in which the in-plane angular distribution is provided at each of the first self-luminous display device 21, the second self-luminous display device 22, and the third self-luminous display device 23 is adopted, an amount of light absorbed by the light absorbing member 40 in the peripheral light of the image light of each of the self-luminous display devices can be suppressed. Therefore, occurrence of a difference in an amount of light between a peripheral portion and a central portion of the image light L can be suppressed. In Embodiment 4, when the self-luminous display device in which the in-plane angular distribution is provided at each of the first self-luminous display device 21, the second self-luminous display device 22 and the third self-luminous display device 23 is adopted, the amount of light absorbed by the annular groove 50 in the peripheral light of the image light of each of the self-luminous display devices can be suppressed. Therefore, the occurrence of a difference in an amount of light between a peripheral portion and a central portion of the image light L can be suppressed.

In Embodiment 5, when the self-luminous display device in which the in-plane angular distribution is provided at each of the first self-luminous display device 21, the second self-luminous display device 22 and the third self-luminous display device 23 is adopted, the amount of light absorbed by the annular groove 50 and the light absorbing member 60 in the peripheral light of the image light of each of the self-luminous display devices can be suppressed. Therefore, the occurrence of a difference in the amount of light between the peripheral portion and the central portion of the image light L can be suppressed. In Embodiment 6, when each of the first self-luminous display device 21, the second self-luminous display device 22, and the third self-luminous display device 23 has an in-plane angular distribution, the amount of light absorbed by the first light absorbing layer 18 and the second light absorbing layer 19 in the peripheral light of the image light of each of the self-luminous display devices can be suppressed. Therefore, the occurrence of a difference in the amount of light between the peripheral portion and the central portion of the image light L can be suppressed.

Modified Example 2

Figure 20:
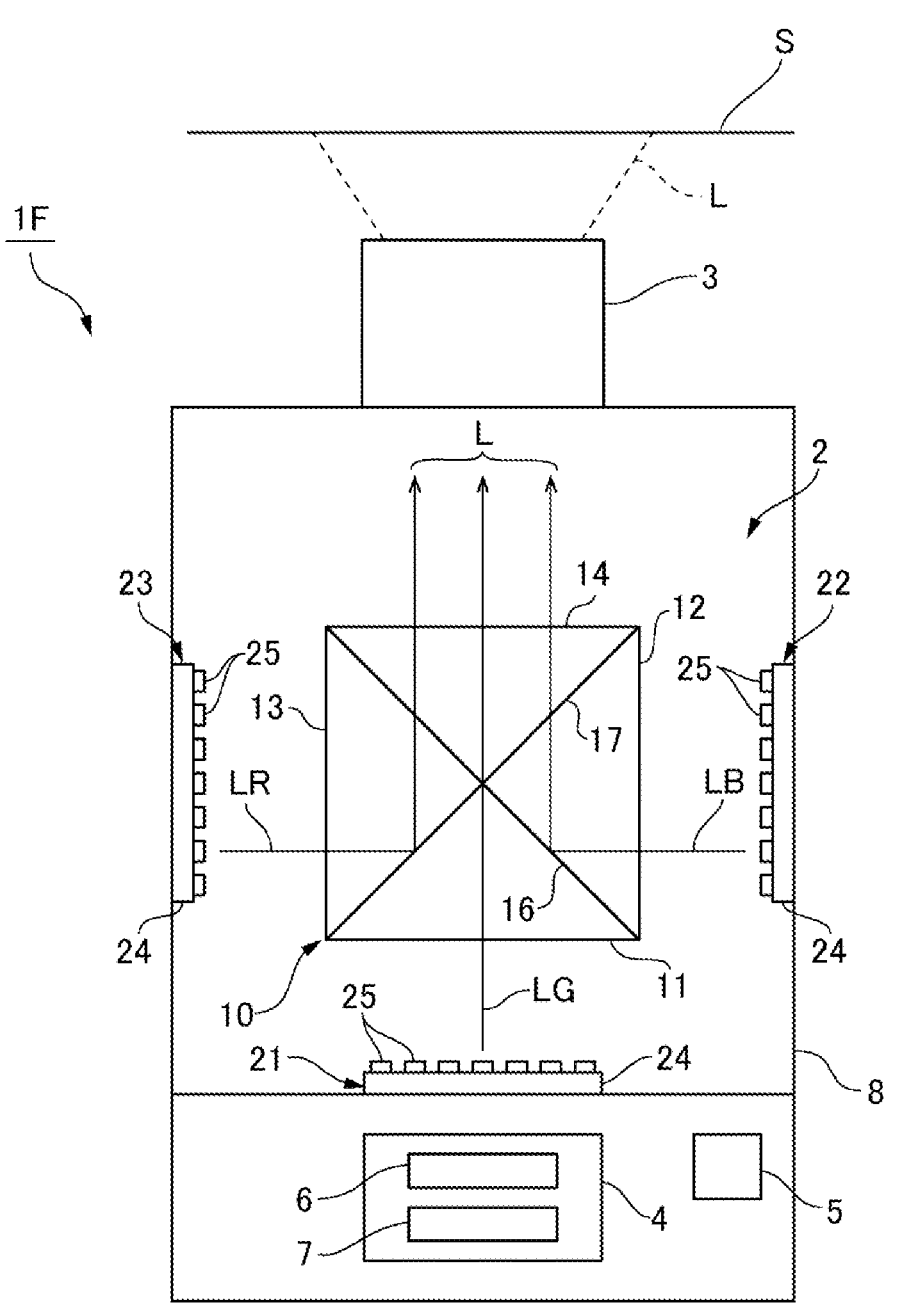
FIG. 20 is a schematic diagram of a projection device when a self-luminous display device has a light emission intensity distribution.
Figure 20:
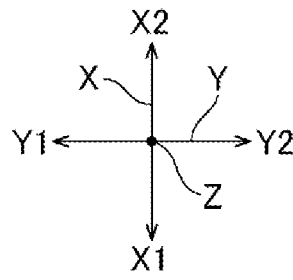
Figure 21:
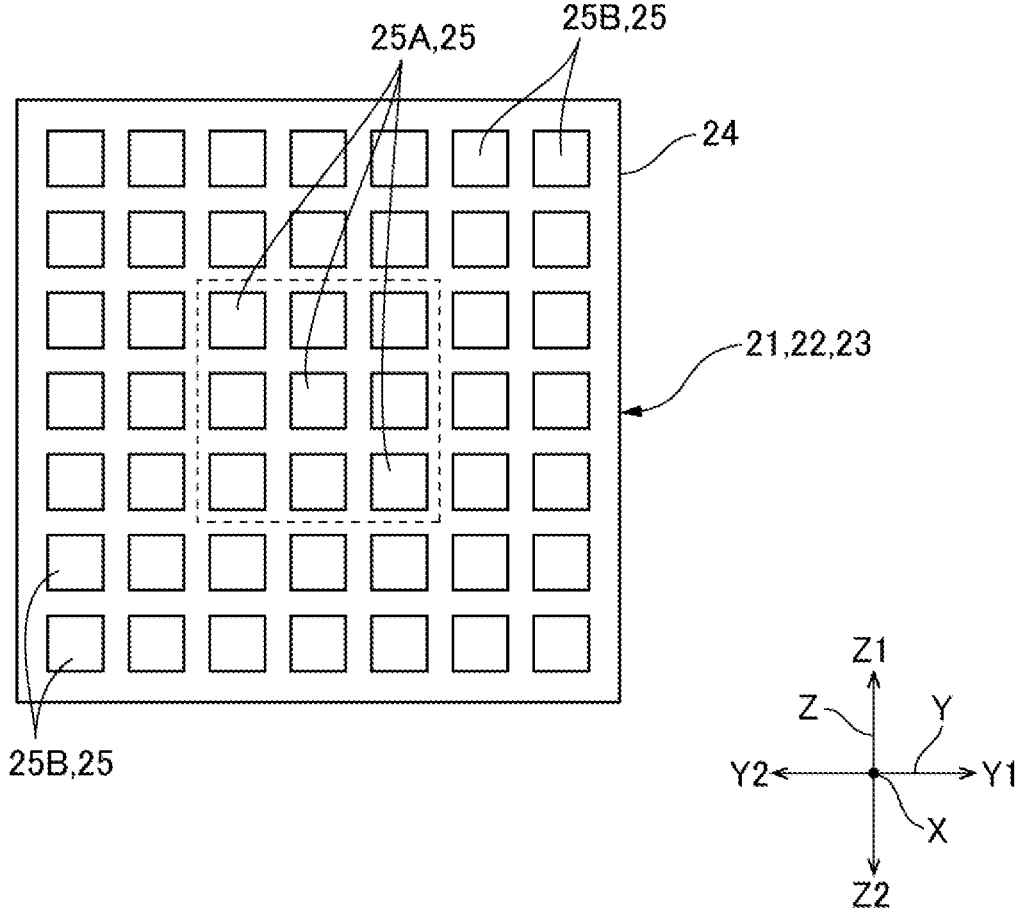
FIG. 21 is an explanatory diagram of a self-luminous display device having a light emission intensity distribution.

In the third to sixth embodiments, the first self-luminous display device 21, the second self-luminous display device 22, and the third self-luminous display device 23 may have a light emission intensity distribution. FIG. 20 is a schematic diagram of a projection device when a self-luminous display device has a light emission intensity distribution. FIG. 21 is an explanatory diagram of the self-luminous display device having the light emission intensity distribution.

As illustrated in FIG. 20, in a projection device 1F of this example, the display driving unit 7 of the control unit 4 includes a light emission intensity control unit. As illustrated in FIG. 21, in each of the self-luminous display devices, the light emission intensity control unit makes light emission intensity of the plurality of outer peripheral side light-emitting elements 25B arranged in a frame shape on the outer peripheral side among the plurality of light-emitting elements 25 higher than light emission intensity of the plurality of inner side light-emitting elements 25B arranged inside the outer peripheral side light-emitting elements 25A. Thus, the image light from each of the self-luminous display devices has an increased amount of peripheral light.

Therefore, in Embodiment 3, when each of the first self-luminous display device 21, the second self-luminous display device 22, and the third self-luminous display device 23 has a light emission intensity distribution, and some of the peripheral light of the image light of each of the self-luminous display devices is absorbed by the light absorbing member 40, it is possible to suppress the occurrence of a difference in the amount of light between the peripheral portion and the central portion of the image light L. In Embodiment 4, when each of the first self-luminous display device 21, the second self-luminous display device 22, and the third self-luminous display device 23 has a light emission intensity distribution, and some of the peripheral light of the image light of each of the self-luminous display devices is absorbed by the annular groove 50, it is possible to suppress the occurrence of a difference in the amount of light between the peripheral portion and the central portion of the image light L.

In Embodiment 5, when each of the first self-luminous display device 21, the second self-luminous display device 22, and the third self-luminous display device 23 has a light emission intensity distribution, and some of the peripheral light of the image light of each of the self-luminous display devices is absorbed by the annular groove 50 and the light absorbing member 60, it is possible to suppress the occurrence of a difference in the amount of light between the peripheral portion and the central portion of the image light L. In Embodiment 6, when each of the first self-luminous display device 21, the second self-luminous display device 22, and the third self-luminous display device 23 has a light emission intensity distribution, and some of the peripheral light of the image light of each of the self-luminous display devices is absorbed by the first light absorbing layer 18 and the second light absorbing layer 19, it is possible to suppress the occurrence of a difference in the amount of light between the peripheral portion and the central portion of the image light L.

Other Embodiments

Figure 22:
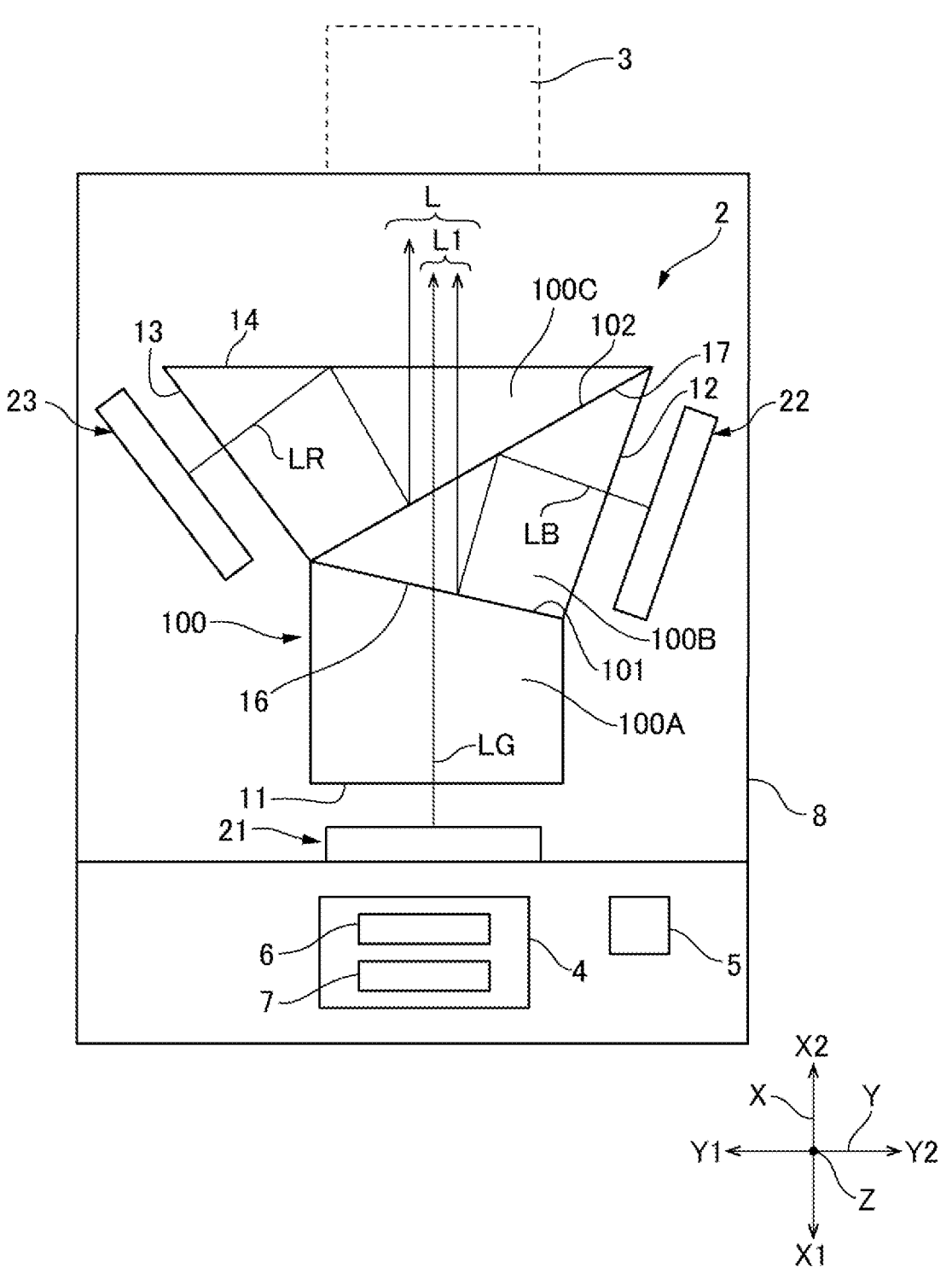
FIG. 22 is a schematic view of an image forming unit using a Philips prism.

In each of the embodiments and modified examples, the dichroic prism may be a Philips prism. FIG. 22 is a schematic diagram of an image forming unit using a Philips prism.

As illustrated in FIG. 22, in the image forming unit 2, the first self-luminous display device 21, the second self-luminous display device 22, and the third self-luminous display device 23 surround the Philips prism 100 from three directions. The projection optical system 3 is located on the side opposite to the first self-luminous display device 21 with the Philips prism 100 interposed therebetween.

The Philips prism 100 includes a trapezoidal first prism 100A, a triangular second prism 100B and a triangular third prism 100C. The Philips prism 100 includes a first surface 11, a fourth surface 14 that faces the first surface 11, a second surface 12 provided between the first surface 11 and the fourth surface, and a third surface that faces the second surface 12. The first surface 11 is located on the side of the first self-luminous display device 21 in the X2 direction. The first surface 11 faces the first self-luminous display device 21 in the X-axis direction. The second surface 12 is located on the side of the second self-luminous display device 22 in the Y1 direction. The second surface 12 is inclined in the Y1 direction toward the X1 direction and faces the second self-luminous display device 22. The third surface 13 is located on the side of the third self-luminous display device 23 in the Y2 direction. The third surface 13 is inclined in the Y2 direction toward the X1 direction and faces the third self-luminous display device 23. The fourth surface 14 is located on the side of the projection optical system 3 in the X1 direction. The fourth surface 14 faces the projection optical system 3 in the X-axis direction. The fourth surface 14 is inclined at an angle of 45° or more with respect to the third surface 13.

The Philips prism 100 has a first dichroic film 16 and a second dichroic film 17. The first dichroic film 16 and the second dichroic film 17 are spaced apart from each other. That is, the first dichroic film 16 is provided on a first joining surface 101 on which the first prism 100A and the second prism 100B are joined to each other. The second dichroic film 17 is provided on a second joint surface 102 on which the second prism 100B and the third prism 100C are joined to each other. The first dichroic film 16 is inclined in the Y2 direction toward the X1 direction. The second dichroic film 17 is inclined in the Y1 direction toward the X1 direction. The second dichroic film 17 is inclined at an angle of 45° or more with respect to the second surface 12.

The first self-luminous display device 21 emits the first image light LG toward the first dichroic film 16 and the second dichroic film 17. The second self-luminous display device 22 emits the second image light LB toward the first dichroic film 16. At this time, the second image light LB is totally reflected by the second dichroic film 17 and travels toward the first dichroic film 16. The third self-luminous display device 23 emits the third image light LR toward the second dichroic film 17. At this time, the third image light LR is totally reflected by the fourth surface 14 and travels toward the second dichroic film 17.

The first dichroic film 16 transmits the first image light LG, reflects the second image light LB, and emits first combined light L1 obtained by combining the first image light LG and the second image light LB. The second dichroic film 17 transmits the first combined light L1 and reflects the third image light LR. The first combined light L1 and the third image light LR are superimposed on each other. Superimposed image light L is emitted from the fourth surface 14 in the X2 direction. The image light L is incident on the projection optical system 3.

In each of the embodiments and the modified examples, even when the Philips prism 100 is used, it is possible to obtain the same actions and effects as those of each of the embodiments and the modified examples.

What is claimed is:

1. A projection device comprising:
a dichroic prism having a first surface, a second surface, a third surface, and a fourth surface, and configured to emit combined image light from the fourth surface;
a first self-luminous display device including a plurality of first light-emitting elements configured to emit light of a first wavelength, the first self-luminous display device being configured to use the light of the first wavelength to emit first image light to the first surface;
a second self-luminous display device including a plurality of second light-emitting elements configured to emit light of a second wavelength, the second self-luminous display device being configured to use the light of the second wavelength to emit second image light to the second surface;
a third self-luminous display device including a plurality of third light-emitting elements configured to emit light of a third wavelength, the third self-luminous display device being configured to use the light of the third wavelength to emit third image light to the third surface; and
a projection optical system configured to project, onto a projection target, the combined image light emitted from the dichroic prism, wherein
the first surface and the fourth surface face each other in an optical axis direction along an optical axis of the image light emitted from the fourth surface, and
an annular outer peripheral surface, of the dichroic prism, surrounding the optical axis is provided with an annular groove surrounding the optical axis, at a position closer to the fourth surface than the first surface.

2. The projection device according to claim 1, further comprising a power supply unit configured to supply power to the first self-luminous display device, the second self-luminous display device, and the third self-luminous display device.

3. The projection device according to claim 1, further comprising a plurality of angle limiting filters respectively disposed between the first self-luminous display device and the first surface, between the second self-luminous display device and the second surface, and between the third self-luminous display device and the third surface, each of the first self-luminous display device, the second self-luminous display device, and the third self-luminous display device includes a plurality of light-emitting elements arranged in a matrix, and the plurality of angle limiting filters is configured to reduce a light distribution angle of image light emitted from each of the plurality of light-emitting elements.

4. The projection device according to claim 1, wherein a light absorbing member having a frame shape is provided at an outer peripheral edge of the fourth surface.

5. The projection device according to claim 1, wherein the annular groove is provided with a light absorbing member.

6. The projection device according to claim 1, wherein the dichroic prism is a Philips prism.

7. The projection device according to claim 1, wherein each of the first self-luminous display device, the second self-luminous display device, and the third self-luminous display device includes a plurality of light-emitting elements arranged in a matrix, and optical axes of a plurality of outer peripheral side light-emitting elements, of the plurality of light-emitting elements, arranged in a frame shape on an outer peripheral side are inclined toward an inner peripheral side.

8. A projection device comprising:

a dichroic prism having a first surface, a second surface, a third surface, and a fourth surface, and configured to emit combined image light from the fourth surface;

a first self-luminous display device including a plurality of first light-emitting elements configured to emit light of a first wavelength, the first self-luminous display device being configured to use the light of the first wavelength to emit first image light to the first surface;

a second self-luminous display device including a plurality of second light-emitting elements configured to emit light of a second wavelength, the second self-luminous display device being configured to use the light of the second wavelength to emit second image light to the second surface;

a third self-luminous display device including a plurality of third light-emitting elements configured to emit light of a third wavelength, the third self-luminous display device being configured to use the light of the third wavelength to emit third image light to the third surface; and a projection optical system configured to project, onto a projection target, the combined image light emitted from the dichroic prism, wherein the dichroic prism includes a first dichroic film and a second dichroic film, the first dichroic film is configured to transmit the first image light and reflect the second image light to combine the first image light and the second image light, the second dichroic film is configured to transmit the first image light and reflect the third image light to combine the first image light and the third image light, image light obtained by combining the first image light, the second image light, and the third image light is emitted from the fourth surface, of the dichroic prism, facing the projection optical system, the first dichroic film is provided with a first light absorbing layer having a frame shape and configured to absorb peripheral light of the first image light and peripheral light of the second image light, and the second dichroic film is provided with a second light absorbing layer having a frame shape and configured to absorb peripheral light of the first image light and peripheral light of the third image light.

9. The projection device according to claim 8, wherein the first dichroic film and the second dichroic film intersect each other.

10. A projection device comprising:

a dichroic prism having a first surface, a second surface, a third surface, and a fourth surface, and configured to emit combined image light from the fourth surface;

a first self-luminous display device including a plurality of first light-emitting elements configured to emit light of a first wavelength, the first self-luminous display device being configured to use the light of the first wavelength to emit first image light to the first surface;

a second self-luminous display device including a plurality of second light-emitting elements configured to emit light of a second wavelength, the second self-luminous display device being configured to use the light of the second wavelength to emit second image light to the second surface;

a third self-luminous display device including a plurality of third light-emitting elements configured to emit light of a third wavelength, the third self-luminous display device being configured to use the light of the third wavelength to emit third image light to the third surface;

a projection optical system configured to project, onto a projection target, the combined image light emitted from the dichroic prism; and a control unit configured to control the first self-luminous display device, the second self-luminous display device, and the third self-luminous display device, wherein the control unit controls light emission intensity of each of the plurality of light-emitting elements in each of the first self-luminous display device, the second self-luminous display device, and the third self-luminous display device, and light emission intensity of a plurality of outer peripheral side light-emitting elements, of the plurality of light-emitting elements, arranged in a frame shape on an outer peripheral side is greater than light emission intensity of a plurality of inner side light-emitting elements, of the plurality of light-emitting elements, arranged inside the plurality of outer peripheral side light-emitting elements.

* * * * *